US011507151B2

(12) United States Patent
Choi et al.

(10) Patent No.: US 11,507,151 B2
(45) Date of Patent: Nov. 22, 2022

(54) DISPLAY APPARATUS

(71) Applicant: SAMSUNG DISPLAY CO., LTD., Yongin-si (KR)

(72) Inventors: Junwon Choi, Yongin-si (KR); Seungwoo Sung, Yongin-si (KR); Hyungjun Park, Yongin-si (KR); Hyunchol Bang, Yongin-si (KR); Changsoo Pyon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 176 days.

(21) Appl. No.: 17/103,278

(22) Filed: Nov. 24, 2020

(65) Prior Publication Data
US 2021/0303040 A1     Sep. 30, 2021

(30) Foreign Application Priority Data

Mar. 30, 2020 (KR) .......................... 10-2020-0038561

(51) Int. Cl.
*G06F 1/16* (2006.01)
*G06F 1/18* (2006.01)

(52) U.S. Cl.
CPC ............ *G06F 1/189* (2013.01); *G06F 1/1605* (2013.01); *G06F 1/1626* (2013.01)

(58) Field of Classification Search
CPC .............. G06F 1/1637; H01L 27/3276; G09G 2300/0426
See application file for complete search history.

(56) References Cited

U.S. PATENT DOCUMENTS

| 10,304,913 | B2 * | 5/2019  | Choi     | G09G 3/20    |
|------------|------|---------|----------|--------------|
| 10,476,032 | B2 * | 11/2019 | Park     | H01L 51/5246 |
| 10,541,380 | B1 * | 1/2020  | Sung     | H01L 51/0097 |
| 10,734,599 | B2 * | 8/2020  | Kishimoto| H01L 51/5237 |
| 10,777,626 | B2 * | 9/2020  | Choi     | H01L 27/3246 |
| 10,884,305 | B2 * | 1/2021  | Yoshida  | G02F 1/13338 |
| 10,923,028 | B2 * | 2/2021  | Lin      | G02F 1/1339  |
| 10,978,519 | B2 * | 4/2021  | Hyeon    | H01L 51/105  |

(Continued)

FOREIGN PATENT DOCUMENTS

| KR | 10-2017-0066767 | 6/2017 |
| KR | 10-2018-0000771 | 1/2018 |

(Continued)

*Primary Examiner* — Adrian S Wilson
(74) *Attorney, Agent, or Firm* — F. Chau & Associates, LLC

(57) ABSTRACT

A display apparatus includes: a substrate having a transmission area, a display area, and a non-display area, wherein the display area surrounds the transmission area, and the non-display area is between the transmission area and the display area; a first wire on the substrate and including a first-1 wire and a first-2 wire extending in a first direction and being spaced apart from each other by the transmission area; a first connecting wire on a same layer as that of the first wire and connecting the first-1 wire to the first-2 wire; and a second wire extending in the first direction and including a second-1 portion and a second-2 portion, wherein the second-1 portion at least partially overlaps the first connecting wire and is arranged on a different layer from that of the first wire, and the second-2 portion is on the same layer as that of the first wire.

20 Claims, 19 Drawing Sheets

(56) References Cited

U.S. PATENT DOCUMENTS

| | | | | |
|---|---|---|---|---|
| 11,004,371 B2* | 5/2021 | Lee | .................. | G09G 3/3225 |
| 11,011,595 B2* | 5/2021 | Lee | .................. | H01L 51/524 |
| 11,100,858 B2* | 8/2021 | An | .................. | G09G 3/3233 |
| 11,101,340 B2* | 8/2021 | Sung | .................. | G09G 3/3233 |
| 11,158,238 B2* | 10/2021 | Yamashita | .......... | G09G 3/2092 |
| 11,201,307 B2* | 12/2021 | Park | .................. | H01L 27/326 |
| 11,227,553 B2* | 1/2022 | Ueno | .................. | G09F 9/30 |
| 11,335,764 B2* | 5/2022 | Her | .................. | H01L 27/3234 |
| 11,348,985 B2* | 5/2022 | Seon | .................. | H01L 27/3246 |
| 11,366,536 B2* | 6/2022 | Gong | .................. | G06F 3/04164 |
| 11,367,383 B2* | 6/2022 | Lee | .................. | G09G 3/32 |
| 11,367,769 B2* | 6/2022 | Kim | .................. | H01L 27/3262 |
| 2017/0162637 A1* | 6/2017 | Choi | .................. | H01L 51/5237 |
| 2017/0372661 A1 | 12/2017 | Gu et al. | | |
| 2021/0335988 A1* | 10/2021 | Um | .................. | G06F 3/0202 |

FOREIGN PATENT DOCUMENTS

| | | |
|---|---|---|
| KR | 10-2019-0069955 | 6/2019 |
| KR | 10-2019-0083383 | 7/2019 |

\* cited by examiner

DISPLAY APPARATUS

CROSS-REFERENCE TO RELATED APPLICATION

This application claims priority under 35 U.S.C. § 119 to Korean Patent Application No. 10-2020-0038561, filed on Mar. 30, 2020, in the Korean Intellectual Property Office, the disclosure of which is incorporated by reference herein in its entirety.

TECHNICAL FIELD

One or more embodiments of the present invention relate to a display apparatus, and more particularly, to a display apparatus including a non-display area and a transmission area.

DISCUSSION OF THE RELATED ART

A display apparatus is a device for visually displaying data. The display apparatus is used as a display unit of small products, such as a mobile phone, and large products, such as a television (TV).

A typical display apparatus includes a substrate partitioned into a display area and a non-display area, and a gate line and a data line are formed insulated from each other in the display area. The gate line and the data line intersect each other to form a plurality of pixel areas in the display area, and the plurality of pixel areas receive electrical signals to emit light so that an image may be displayed. A thin film transistor and a pixel electrode electrically connected to the thin film transistor are provided in correspondence to each of the pixel areas, and an opposite electrode is commonly provided in the pixel areas. The non-display area may include various wires configured to transmit an electrical signal to the display area, a gate driver, a data driver, and a controller.

In recent years, the use of display apparatuses has been diversified. In addition, such display apparatuses have become thinner and lighter, and their range of use is widening. In addition, display apparatuses are currently under development to expand the display area of the display apparatus. Various studies have been conducted to expand the display area of the display apparatus.

SUMMARY

According to an embodiment of the present invention, a display apparatus includes: a substrate having a transmission area, a display area, and a non-display area, wherein the display area surrounds the transmission area, and the non-display area is between the transmission area and the display area; a first wire arranged on the substrate and including a first-1 wire and a first-2 wire extending in a first direction and being spaced apart from each other by the transmission area; a first connecting wire arranged on a same layer as that of the first wire and connecting the first-1 wire to the first-2 wire; and a second wire extending in the first direction and including a second-1 portion and a second-2 portion, wherein the second-1 portion at least partially overlaps the first connecting wire and is arranged on a different layer from that of the first wire, and the second-2 portion is arranged on the same layer as that of the first wire.

In an embodiment of the present invention, the display apparatus further includes: an insulating layer between the substrate and the first wire and having a contact hole at least partially exposing the second-1 portion of the second wire, and the second-2 portion of the second wire is connected to the second-1 portion through the contact hole.

In an embodiment of the present invention, the first connecting wire includes a first-1 connecting wire extending in the first direction, a first-2 connecting wire connected to one end of the first-1 connecting wire and extending in a second direction crossing the first direction, and a first-3 connecting wire connected to the other end of the first-1 connecting wire and extending in a third direction crossing the first direction.

In an embodiment of the present invention, the first-2 connecting wire contacts the first-1 wire, and the first-3 connecting wire contacts the first-2 wire.

In an embodiment of the present invention, different signals are applied to the first wire and the second wire.

In an embodiment of the present invention, the first connecting wire includes a first node and a second node, wherein the first node contacts the first-1 wire, and the second node contacts the first-2 wire, and wherein a same signal is applied to the first-1 wire and the first-2 wire through the first node and the second node.

In an embodiment of the present invention, the first wire and the second wire include data lines.

In an embodiment of the present invention, the display apparatus further includes: a third wire arranged on the same layer as that of the first wire and including a third-1 wire and a third-2 wire extending in the first direction and being spaced apart from each other by the transmission area; and a second connecting wire arranged on the same layer as that of the third wire and connecting the third-1 wire to the third-2 wire.

In an embodiment of the present invention, the first connecting wire is arranged closer to the transmission area than the second connecting wire.

In an embodiment of the present invention, the first connecting wire and the second connecting wire are arranged on one side and another side, respectively, of the transmission area.

In an embodiment of the present invention, the transmission area includes a first transmission area and a second transmission area that are spaced apart from each other, wherein the first-1 wire and the first-2 wire are spaced apart from each other by the first transmission area, and the third-1 wire and the third-2 wire are spaced apart from each other by the second transmission area, and the first connecting wire is spaced apart from the second transmission area, and the second connecting wire is spaced apart from the first transmission area.

In an embodiment of the present invention, the first wire and the first connecting wire are a single body.

According to an embodiment of the present invention, a display apparatus includes: a substrate having a transmission area, a display area, and a non-display area, wherein the display area surrounds the transmission area, and the non-display area is between the transmission area and the display area; a first wire arranged on the substrate and including a first-1 wire and a first-2 wire extending in a first direction and being spaced apart from each other by the transmission area; an insulating layer arranged on the first wire and including a first contact hole and a second contact hole, wherein the first contact hole at least partially exposes the first-1 wire, and the second contact hole at least partially exposes the first-2 wire; and a first connecting wire arranged on the insulating layer and bypassing the transmission area, wherein the first connecting wire connects the first-1 wire to the first-2 wire through the first contact hole and the second contact hole.

In an embodiment of the present invention, the first connecting wire includes a first-1 connecting wire extending in the first direction, a first-2 connecting wire connected to one end of the first-1 connecting wire and extending in a second direction crossing the first direction, and a first-3 connecting wire connected to the other end of the first-1 connecting wire and extending in a third direction crossing the first direction.

In an embodiment of the present invention, a portion of the first-2 connecting wire is disposed in the first contact hole to contact the first-1 wire, wherein a portion of the first-3 connecting wire is disposed in the second contact hole to contact the first-2 wire, and a same signal is applied to the first-1 wire and the first-2 wire through the first contact hole and the second contact hole.

In an embodiment of the present invention, the display apparatus further includes a second wire arranged on a same layer as that of the first wire and at least partially overlapping the first connecting wire, wherein different signals are applied to the first wire and the second wire.

In an embodiment of the present invention, the first wire and the second wire include scan lines.

In an embodiment of the present invention, the display apparatus further includes: a second wire arranged on a same layer as that of the first wire and including a second-1 wire and a second-2 wire extending in the first direction and being spaced apart from each other by the transmission area; and a second connecting wire arranged on the insulating layer corresponding to the display area and connecting the second-1 wire to the second-2 wire, wherein the first connecting wire is arranged closer to the transmission area than the second connecting wire.

In an embodiment of the present invention, the display apparatus further includes: a second wire arranged on a same layer as that of the first wire and including a second-1 wire and a second-2 wire extending in the first direction and being spaced apart from each other by the transmission area; and a second connecting wire arranged on the insulating layer corresponding to the display area and connecting the second-1 wire to the second-2 wire, wherein the first connecting wire and the second connecting wire are arranged on one side and another side, respectively, of the transmission area.

In an embodiment of the present invention, the display apparatus further includes: a first data line arranged on the substrate and including a first-1 data line and a first-2 data line extending in a second direction crossing the first direction and being spaced apart from each other by the transmission area; a second connecting wire arranged on a same layer as that of the first data line corresponding to the display area, and connecting the first-1 data line to the first-2 data line; and a second data line extending in the second direction and including a second-1 portion and a second-2 portion, wherein the second-1 portion at least partially overlaps the second connecting wire and is arranged on a different layer from that of the first data line, and the second-2 portion is arranged on the same layer as that of the first data line.

BRIEF DESCRIPTION OF THE DRAWINGS

The above and other, features of the present invention will be more apparent by describing in detail embodiments thereof, with reference to the accompanying drawings, in which.

DETAILED DESCRIPTION OF THE EMBODIMENTS

Figure 1:
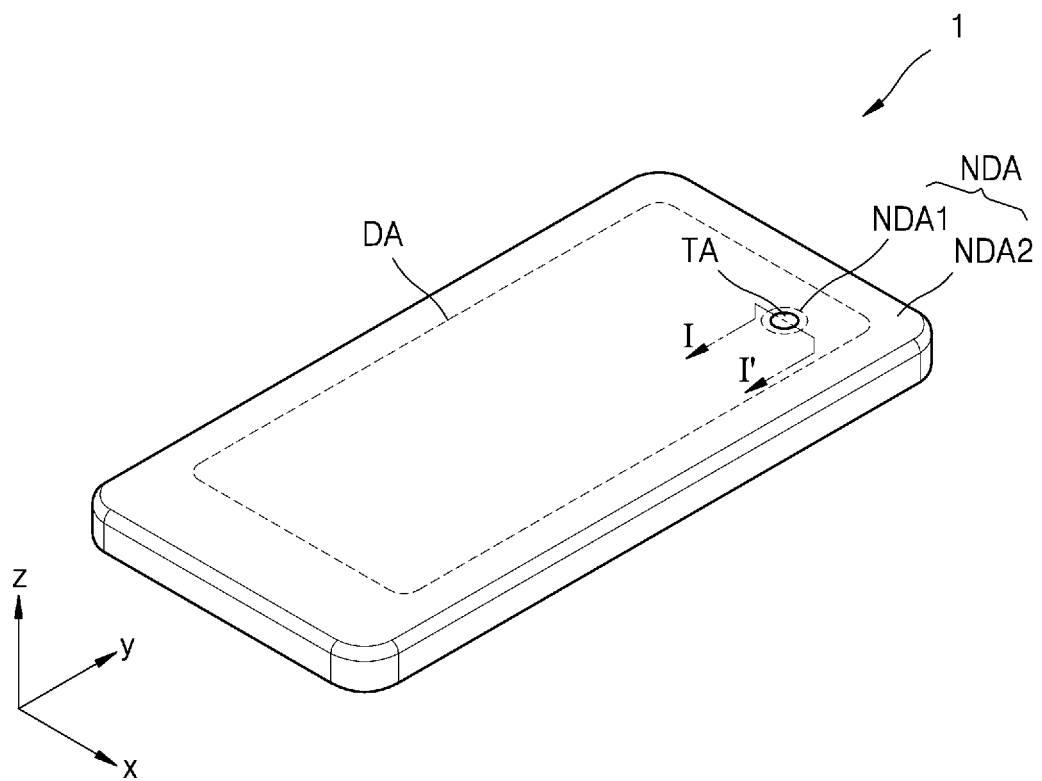
FIG. 1 is a perspective view of a display apparatus according to an embodiment of the present invention.

Embodiments of the present invention will now be described more fully with reference to the accompanying drawings. It is to be understood that the present invention may be embodied in different forms and thus should not be construed as being limited to the embodiments set forth herein. It is to be understood that like reference numerals may refer to like elements throughout the specification, and thus redundant descriptions may be omitted. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

It will be understood that although the terms "first," "second," etc. may be used herein to describe various components, these components should not be limited by these terms and these terms are only used to distinguish one component from another component. Thus, a first component discussed below could be termed a second component without departing from the spirit and scope of the present invention.

It is to be understood that an expression used in the singular encompasses the expression of the plural, unless it clearly has a different meaning in the context.

It will be understood that when a layer, region, or element is referred to as being "formed on" another layer, area, or element, it can be directly or indirectly formed on the other layer, region, or element. For example, intervening layers, regions, or elements may be present.

Sizes of elements in the drawings may be exaggerated for clarity. In other words, since sizes and thicknesses of components in the drawings may be exaggerated for clarity, the present invention not limited thereto.

When an embodiment of the present invention may be implemented differently, a specific process order may be performed differently from the described order. For example, two consecutively described processes may be performed substantially at the same time or performed in an order opposite to the described order.

In the specification, the term "A and/or B" refers to the case of A or B, or A and B. In the specification, the term "at least one of A and B" refers to the case of A or B, or A and B.

It will be understood that when a layer, region, or component is connected to another layer, region or component, the layer, region, or component may be directly connected to the other layer, region or component, or an intervening layer, region, or component may exist, such that the layer, region, or component may be indirectly connected to the other layer, region or component. For example, when a layer, region, or component is electrically connected to another layer, region or component, the layer, region, or component may be directly electrically connected to the layer, region or component or may be indirectly connected to the other layer, region or component through an intervening layer, region, or component.

An x-axis, a y-axis and a z-axis are not limited to three axes of the rectangular coordinate system and may be interpreted in a broader sense. For example, the x-axis, the y-axis, and the z-axis may be perpendicular to one another, or may represent different directions that are not perpendicular to one another.

FIG. 1 is a perspective view of a display apparatus 1 according to an embodiment of the present invention.

Referring to FIG. 1, the display apparatus 1 includes a display area DA for emitting light and a non-display area NDA for not emitting light. The non-display area NDA is adjacent to the display area DA. The display apparatus 1 may provide a certain image using light emitted from a plurality of pixels arranged in the display area DA. In addition, an image may not be displayed in the non-display area NDA.

The display apparatus 1 includes a transmission area TA at least partially surrounded by the display area DA. In an embodiment of the present invention, FIG. 1 shows that the transmission area TA is entirely surrounded by the display area DA. The non-display area NDA may include a first non-display area NDA1 and a second non-display area NDA2. The first non-display area NDA1 may surround the transmission area TA, and the second non-display area NDA2 may surround an outer periphery of the display area DA. For example, the first non-display area NDA1 may entirely surround the transmission area TA. As an additional example, the display area DA may entirely surround the first non-display area NDA1, and the second non-display area NDA2 may entirely surround the display area DA. In addition, even though the transmission area TA is illustrated as a circle, the present invention is not limited thereto. For example, the transmission area TA may have a polygonal shape or another circular shape.

Hereinafter, an organic light-emitting display apparatus is described as an example of the display apparatus 1 according to an embodiment of the present invention, but a display apparatus of the disclosure is not limited thereto. In an embodiment of the present invention, various display apparatuses such as an inorganic light-emitting (EL) display and a quantum dot EL display may be used.

Figure 2:
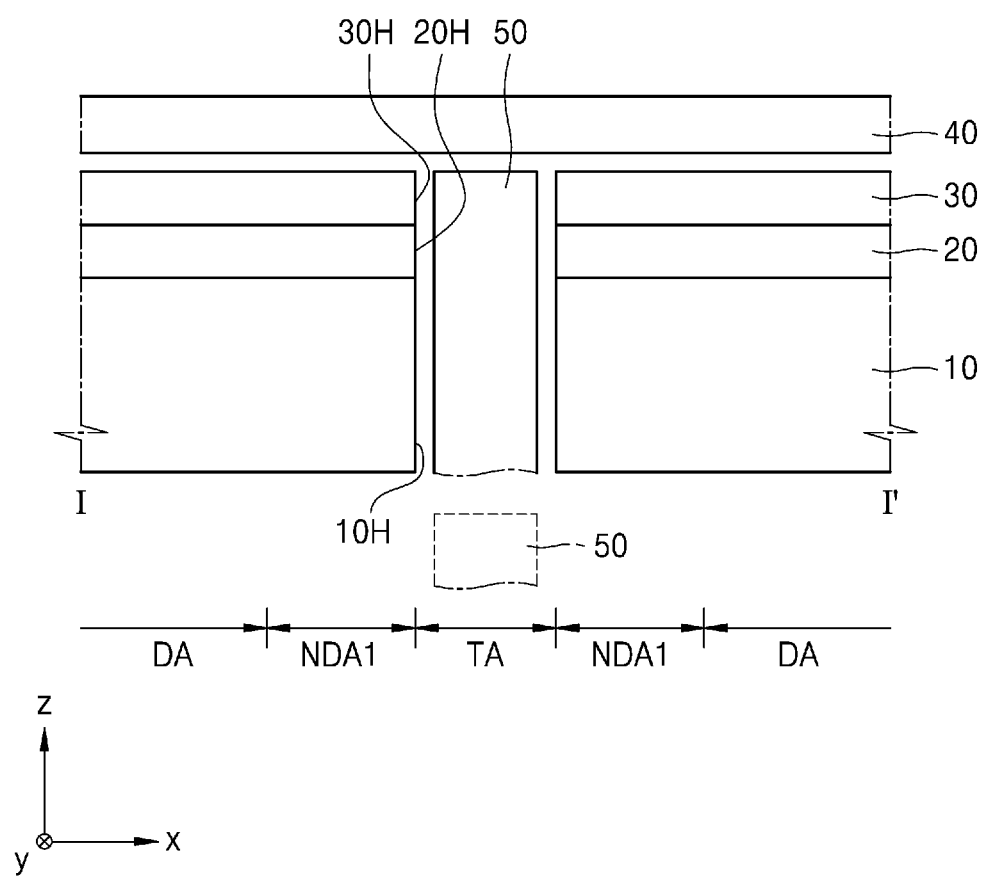
FIG. 2 is a cross-sectional view of a display apparatus according to an embodiment of the present invention.

FIG. 2 is a cross-sectional view schematically showing a display apparatus according to an embodiment of the present invention and may correspond to a cross-section of the display apparatus 1 taken along a line I-I' in FIG. 1.

Referring to FIG. 2, the display apparatus 1 (see FIG. 1) may include a display panel 10, an input sensing member 20 on the display panel 10, and an optical functional member 30, which may be covered with a window 40. The display apparatus 1 may be a variety of electronic devices such as a mobile phone, a laptop computer, and a smart watch.

The display panel 10 may display an image. The display panel 10 includes pixels arranged in the display area DA. The pixels may include a display element and a pixel circuit connected thereto. The display element may include an organic EL diode, an inorganic EL diode, or a quantum dot EL diode.

The input sensing member 20 obtains coordinate information according to an external input, for example, a touch event. The input sensing member 20 may include a sensing electrode (e.g., a touch electrode) and a trace line connected to the sensing electrode. The input sensing member 20 may be on the display panel 10.

For example, the input sensing member 20 may be formed directly on the display panel 10 or may be formed separately and then coupled to the display panel 10 through an adhesive layer such as an optical transparent adhesive (OCA). For example, the input sensing member 20 may be continuously formed after the process of forming the display panel 10 in which case the adhesive layer may not be between the input sensing member 20 and the display panel 10. FIG. 2 shows that the input sensing member 20 is arranged between the display panel 10 and the optical functional member 30, but as another example, the input sensing member 20 may be on the optical functional member 30.

The optical functional member 30 may include an antireflective layer. The antireflective layer may reduce the reflectance of light (e.g., external light) incident from the outside toward the display panel 10 through the window 40. For example, the antireflective layer may include a retarder and a polarizer. For example, the retarder may be of a film type or a liquid crystal coating type and may include a $\lambda/2$ retarder and/or a $\lambda/4$ retarder. In addition, the polarizer may be of a film type or a liquid crystal coating type. The film type may include a stretch-type synthetic resin film, and the liquid crystal coating type may include liquid crystals arranged in a certain arrangement. The retarder and the polarizer may further include a protective film. The retarder and the polarizer or the protective film may be a base layer of the antireflective layer.

In an embodiment of the present invention, the antireflective layer may include a black matrix and color filters. The color filters may be arranged considering the color of light emitted from each of the pixels of the display panel 10. In an embodiment of the present invention, the antireflective layer may include a destructive interference structure. The destructive interference structure may include a first reflective layer and a second reflective layer on respective layers. First reflected light and second reflected light respectively reflected by the first reflective layer and second reflective layer may destructively interfere, and thus, external light reflectance may be reduced.

The optical functional member 30 may include a lens layer. The lens layer may increase the luminous efficiency of light emitted from the display panel 10 or may reduce color deviation. The lens layer may include a layer having a concave or convex lens shape or/and may include a plurality of layers having different refractive indices. The optical functional member 30 may include all or some of the above-described antireflective layer and lens layer.

The display panel 10, the input sensing member 20, and the optical functional member 30 may include an opening. In this regard, FIG. 2 shows that the display panel 10, the input sensing member 20, and the optical functional member 30 include first to third openings 10H, 20H and 30H, respectively, and the first to third openings 10H, 20H, and 30H overlap each other. The first to third openings 10H, 20H, and 30H are located to correspond to the transmission area TA. For example, the transmission area TA may be an area in which light and/or sound that is output from a component 50 travels to the outside. In addition, the transmission area TA may be an area in which light and/or sound travels from the outside toward the component 50, and the transmission area TA may be an area formed through the first to third openings 10H, 20H, and 30H.

In an embodiment of the present invention, at least one of the display panel 10, the input sensing member 20, and/or the optical functional member 30 may not include an opening. For example, one or two components selected from the display panel 10, the input sensing member 20, and the optical functional member 30 may not include an opening. The display panel 10, the input sensing member 20, and the optical function member 30 may not all include an opening.

The component 50 may correspond to the transmission area TA. The component 50 may be in the first to third openings 10H, 20H, and 30H as shown by solid lines in FIG. 2, or may be under the display panel 10 as shown by dashed lines in FIG. 2.

The component 50 may include an electronic element. For example, the component 50 may include an electronic component utilizing light or sound. For example, the electronic component may include a sensor that receives light such as an infrared sensor, a camera that captures an image by receiving light, a sensor that outputs and detects light and sound to measure distance or recognize fingerprints, a small lamp that outputs light, a speaker that outputs sound, and the like. In the case of an electronic element using light, light of various wavelength bands such as visible light, infrared light, ultraviolet light, and the like may be used.

In an embodiment of the present invention, when the display apparatus 1 is used as a smart watch or a vehicle instrument panel, the component 50 may be a member including a clock needle or a needle indicating certain information (e.g., vehicle speed, etc.). When the display apparatus 1 includes a clock needle or a vehicle instrument panel, the component 50 may be exposed to the outside through the window 40, and the window 40 may include an opening corresponding to the transmission area TA.

The component 50 may include component(s) associated with the function of the display panel 10 as described above, or may include components, such as accessories, that increase aesthetics of the display panel 10.

Figure 3:
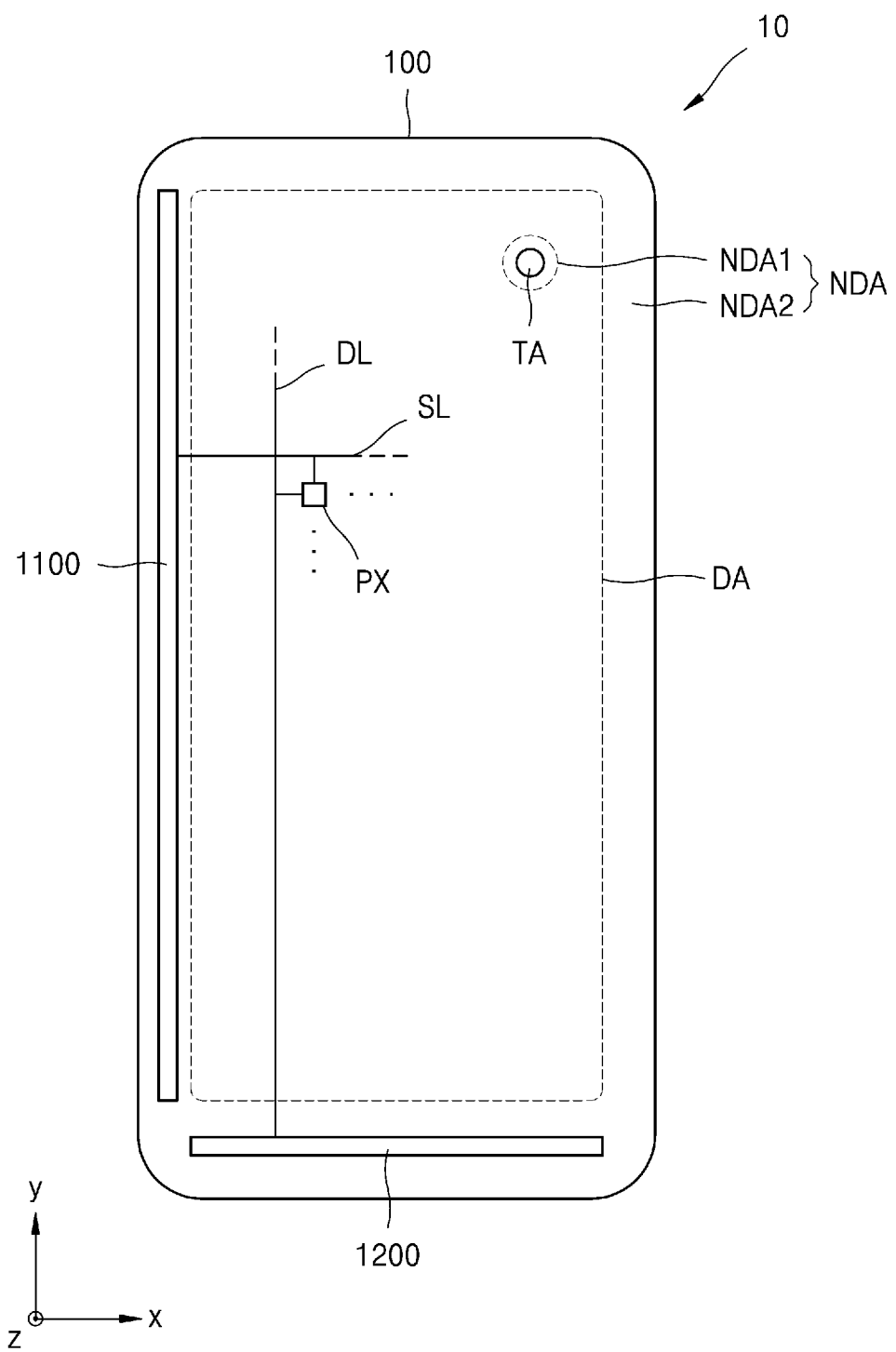
FIG. 3 is a plan view of a display panel according to an embodiment of the present invention.

FIG. 3 is a plan view of a display panel according to an embodiment of the present invention.

Referring to FIG. 3, the display panel 10 includes the display area DA and the non-display area NDA. The non-display area NDA includes the first non-display area NDA1 and the second non-display area NDA2. FIG. 3 may be understood as a view of a substrate 100 of the display panel 10. For example, it can be understood that the substrate 100 has the transmission area TA, the display area DA, and the non-display area NDA. In addition, the display panel 10 includes a plurality of pixels PXs arranged in the display area DA.

The first non-display area NDA1 may surround the transmission area TA. The first non-display area NDA1 is an area in which a display element such as an organic light-emitting diode that emits light is not arranged. In the first non-display area NDA1, signal lines that provide signals to the pixels PX provided around the transmission area TA may pass. The second non-display area NDA2 may include a scan driver 1100 for providing a scan signal to each pixel PX through a scan line SL, a data driver 1200 for providing a data signal to each pixel PX through a data line DL, and a main power wire for providing first and second power supply voltages. FIG. 3 shows that the data driver 1200 is adjacent to one side of the substrate 100. According to an embodiment of the present invention, the data driver 1200 may be on a flexible printed circuit board (FPCB) electrically connected to a pad on one side of the display panel 10. FIG. 3 shows that the scan driver 1100 and the data driver 1200 are arranged on different sides of the substrate 100. However, according to an embodiment of the present invention, the scan driver 1100 and the data driver 1200 may be arranged on the same side of the substrate 100.

Figure 4:
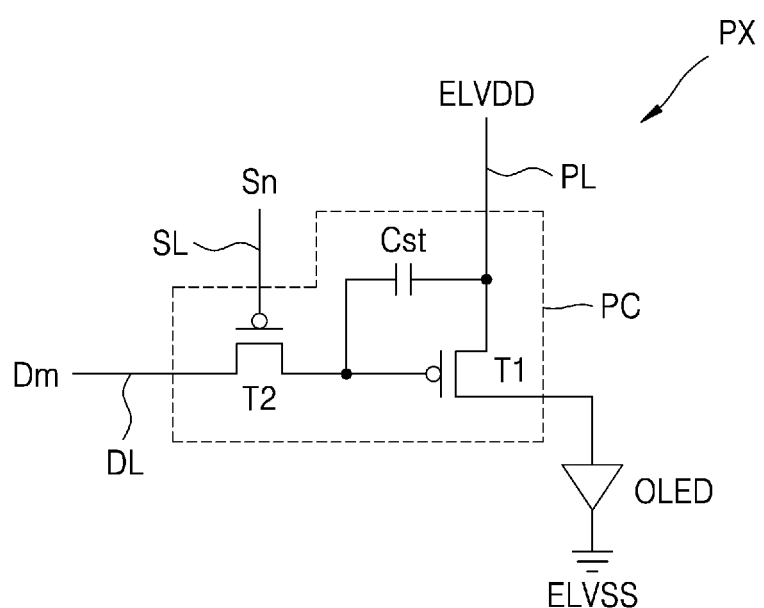
FIG. 4 is a circuit diagram of one pixel of a display panel according to an embodiment of the present invention.

FIG. 4 is a circuit diagram of one pixel of a display panel according to an embodiment of the present invention.

Referring to FIG. 4, each pixel PX includes a pixel circuit PC connected to a scan line SL and a data line DL and an organic light-emitting diode OLED connected to the pixel circuit PC.

The pixel circuit PC includes a driving thin-film transistor T1, a switching thin-film transistor T2, and a storage capacitor Cst. The switching thin-film transistor T2 is connected to the scan line SL and the data line DL, and supplies a data signal Dm received through the data line DL according to a scan signal Sn received through the scan line SL to the driving thin-film transistor T1.

The storage capacitor Cst is connected to the switching thin-film transistor T2 and a driving voltage line PL, and stores a voltage corresponding to a difference between a voltage supplied from the switching thin-film transistor T2 and a driving voltage ELVDD supplied to the driving voltage line PL.

The driving thin-film transistor T1 is connected to the driving voltage line PL and the storage capacitor Cst, and may control a driving current flowing through the organic light-emitting diode OLED from the driving voltage line PL corresponding to a voltage value stored in the storage capacitor Cst. The organic light-emitting diode OLED may emit light having certain luminance according to the driving current.

Although FIG. 4 describes a case where the pixel circuit PC includes two thin-film transistors and one storage capacitor Cst, the present invention is not limited thereto. For example, the pixel circuit PC may include three or more thin-film transistors and/or two or more storage capacitors. In an embodiment of the present invention, the pixel circuit PC may include seven thin-film transistors and one storage capacitor.

Figure 5:
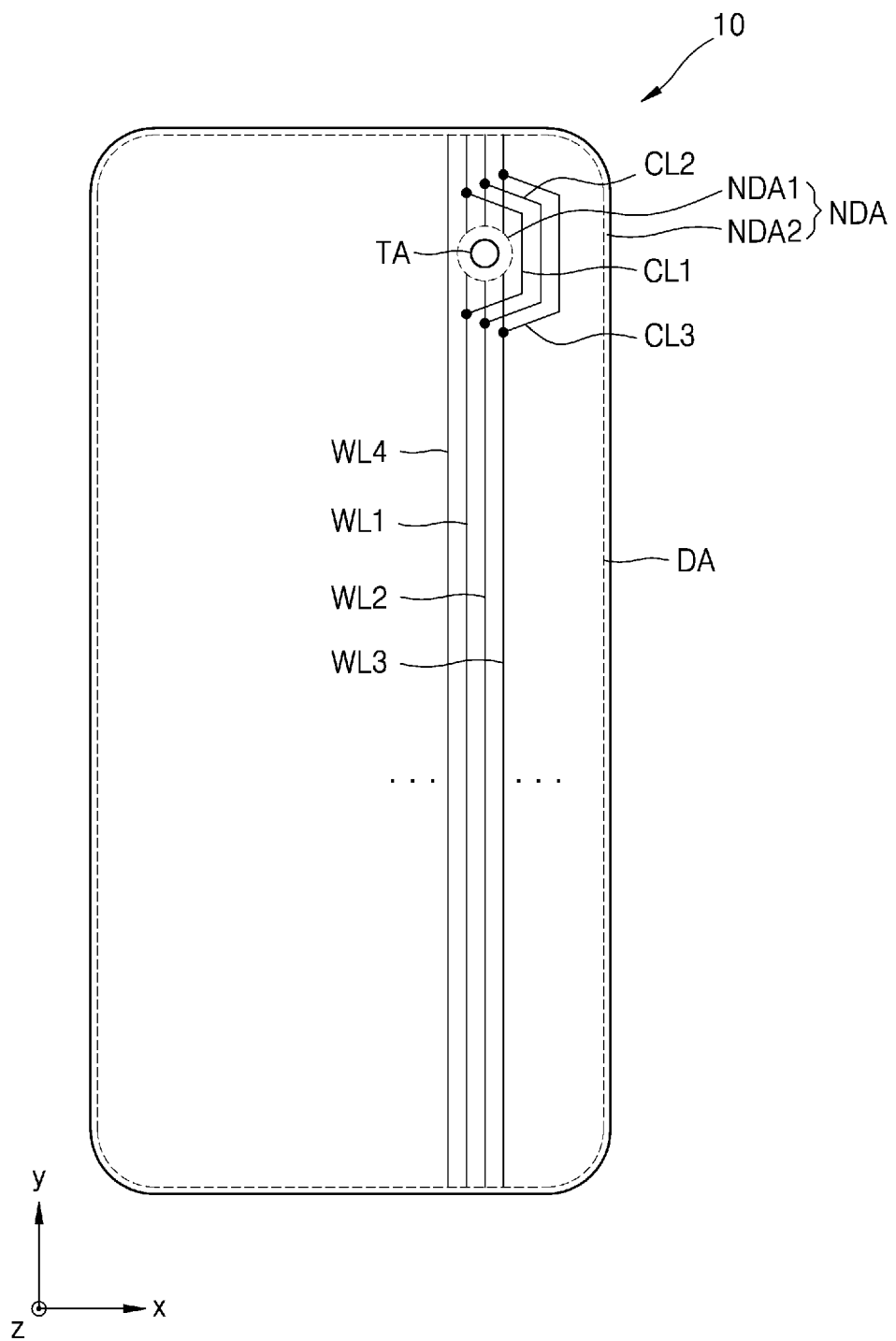
FIG. 5 is a diagram of a data line of the display apparatus of FIG. 1.
Figure 6:
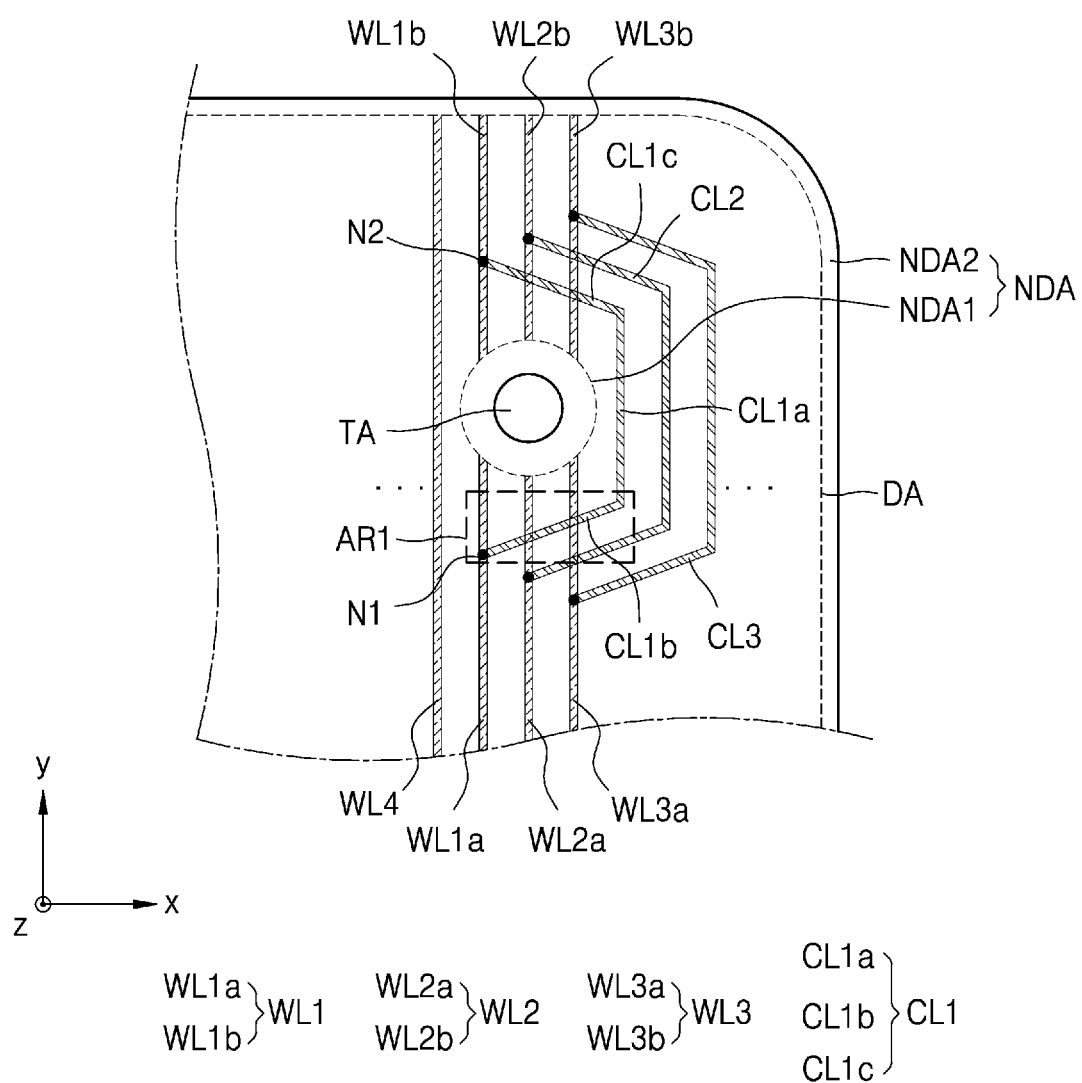
FIG. 6 is an enlarged plan view of a portion of FIG. 5.

FIG. 5 is a diagram of a data line of the display apparatus of FIG. 1, and FIG. 6 is an enlarged plan view of a portion of FIG. 5.

Various signals may be applied to the display area DA. For example, a data signal or the like for adjusting the brightness in each pixel may be applied to the display area DA, and for this purpose, as schematically illustrated in FIG. 5, first to fourth wires WL1, WL2, WL3, and WL4 that are substantially parallel to each other may be located inside and outside of the display area DA on the substrate 100. For example, some of the wires WL1, WL2, WL3 and WL4 may be positioned in the non-display area NDA. In an embodiment of the present invention, the first to fourth wires WL1, WL2, WL3, and WL4 may be the data lines DL described above with reference to FIGS. 3 and 4. FIG. 5 shows only wires adjacent to the transmission area TA, so that the display panel 10 includes four wires, but this is only an example, and the display area DA may include more than four wires.

The first wire WL1 extends in a first direction (e.g., a y direction). The first wire WL1 includes a first-1 wire WL1a and a first-2 wire WL1b that are spaced apart from each other by the transmission area TA. The first-2 wire WL1b is arranged to coincide with a virtual line extending in the first direction from the first-1 wire WL1a. For example, the virtual line extending in the first direction from the first-1 wire WL1a and a virtual line extending in the first direction from the first-2 wire WL1b coincide with each other. As an additional example, the first-1 wire WL1a may be aligned with the first-2 wire WL1b. For example, the first wire WL1 may be integrally formed and then disconnected as the transmission area TA is formed, thereby forming the first-1 wire WL1a and the first-2 wire WL1b. As another example, the first-1 wire WL1a and the first-2 wire WL1b may be formed by patterning.

The second wire WL2 extends in the first direction in substantially the same manner as the first wire WL1, and includes a second-1 wire WL2a and a second-2 wire WL2b that are spaced apart from each other by the transmission area TA. The third wire WL3 also extends in the first direction in substantially the same manner as the first wire WL1 and the second wire WL2 and includes a third-1 wire WL3a and a third-2 wire WL3b that are spaced apart from each other by the transmission area TA. The description of the first wire WL1 applies to the second wire WL2 and the third wire WL3.

Unlike the first to third wires WL1, WL2, and WL3, the fourth wire WL4 does not partially overlap the transmission area TA. Therefore, the fourth wire WL4 may be integrally formed without a portion disconnected or separated by the transmission area TA. Like the first to third wires WL1, WL2, and WL3, the fourth wire WL4 extends in the first direction.

First to third connecting wires CL1, CL2, and CL3 are arranged on the substrate 100 corresponding to the display area DA. The first connecting wire CL1 connects the first-1 wire WL1a to the first-2 wire WL1b that are spaced apart from each other by the transmission area TA. The first connecting wire CL1 may be arranged to bypass the transmission area TA and may be arranged on the same layer as that of the first wire WL1. For example, the first connecting wire CL1 and the first wire WL1 may be integrally formed or separately formed. For example, the first connecting wire CL1 and the first wire WL1 may be a single body.

Likewise, the second connecting wire CL2 connects the second-1 wire WL2a to the second-2 wire WL2b that are spaced apart from each other by the transmission area TA, and the third connecting wire CL3 connects the third-1 wire WL3a to the third-2 wire WL3b that are spaced apart from each other by the transmission area TA. For example, the second connecting wire CL2 and the third connecting wire CL3 may be integrally formed with the second wire WL2 and the third wire WL3, respectively. However, the present invention is not limited thereto.

The first connecting wire CL1 includes a first node N1 contacting the first-1 wire WL1a and a second node N2 contacting the first-2 wire WL1b. The same signal may be applied to the first-1 wire WL1a and the first-2 wire WL1b through the first node N1 and the second node N2 of the first connecting wire CL1. For example, one signal may be applied to the first wire WL1 including the first-1 wire WL1a and the first-2 wire WL1b. Further, the description of the first connecting wire CL1 may apply to the second connecting wire CL2 and the third connecting wire CL3.

The first connecting wire CL1 may include substantially the same material as that of the first wire WL1. For example, the first connecting wire CL1 may be arranged on the same layer as that of the first wire WL1 and may contact the first-1 wire WL1a and the first-2 wire WL1b, respectively, to each other. In this case, a portion of the second wire WL2 and a portion of the third wire WL3 overlapping the first connecting wire CL1 may be arranged on a different layer from those of the first wire WL1 and the first connecting wire CL1. Although the first connecting wire CL1 has been described as a reference, the same description applies to the second connecting wire CL2 and the third connecting wire CL3. Through this, the first to third wires WL1, WL2, and WL3 are not connected to each other, and different signals may be applied to the first to third wires WL1, WL2, and WL3. This will be described in detail with reference to FIGS. 7 to 9. However, the present invention is not limited thereto. In an embodiment of the present invention, the first connecting wire CL1 may be arranged on a layer different from that of the first wire WL1 and may connect the first-1 wire WL1a and the first-2 wire WL1b to each other through respective vias. In addition, the second wire WL2 and the third wire WL3 may be disposed on a same layer as that of the first wire WL1.

In an embodiment of the present invention, as illustrated in FIGS. 5 and 6, the distance from the transmission area TA to the second connecting wire CL2 may be longer than to the first connecting wire CL1, and the distance from the transmission area TA to the third connecting wire CL3 may be longer than to the second connecting wire CL2. For example, the first connecting wire CL1 may be arranged closest to the transmission area TA, and the third connecting wire CL3 may be arranged farthest from the transmission area TA. The second connecting wire CL2 may be arranged between the first connecting wire CL1 and the third connecting wire CL3. However, shapes in which the first to third connecting wires CL1, CL2, and CL3 are arranged may vary, and the ones illustrated in FIGS. 10 to 12 correspond to an embodiment of the present invention. This will be described in detail with reference to FIGS. 10 to 12.

According to an embodiment of the present invention, the first wire WL1 includes the first-1 wire WL1a and the first-2 wire WL1b that are spaced apart from each other by the transmission area TA, and the first-1 wire WL1a and the first-2 wire WL1b may be connected to each other b the first connecting wire CL1.

As a comparative example, a plurality of wires arranged adjacent to a transmission area of a display panel may be formed extending in a first direction and bypassing along an edge of the transmission area. At this time, the plurality of wires are spaced apart from each other at regular intervals, and are densely arranged when bypassing along the edge of the transmission area. Because the plurality of wires are densely arranged at the edge of the transmission area, a space in which a plurality of thin-film transistors, a storage capacitor, and the like may be arranged is reduced, and thus, pixels cannot be formed. For example, the edge of the transmission area with respect to which the plurality of wires bypass corresponds to a non-display area in which pixels are not arranged. A space is required to bypass a plurality of wires, and accordingly, a non-display area surrounding a transmission area is formed wide.

However, as in an embodiment of the present invention, the first wire WL1 may include the first-1 wire WL1a and the first-2 wire WL1b that are spaced apart from each other by the transmission area TA. In this case, the first wire WL1 does not need to bypass along the edge of the transmission area TA, and the first wire WL1 may be arranged to be adjacent to the transmission area TA. For example, the first non-display area NDA1 surrounding the transmission area TA may be reduced. In addition, because the first-1 wire WL1a and first-2 wire WL1b are connected to each other by the first connecting wire CL1, the same signal may be applied to the first-1 wire WL1a and the first-2 wire WL1b.

Figure 7:
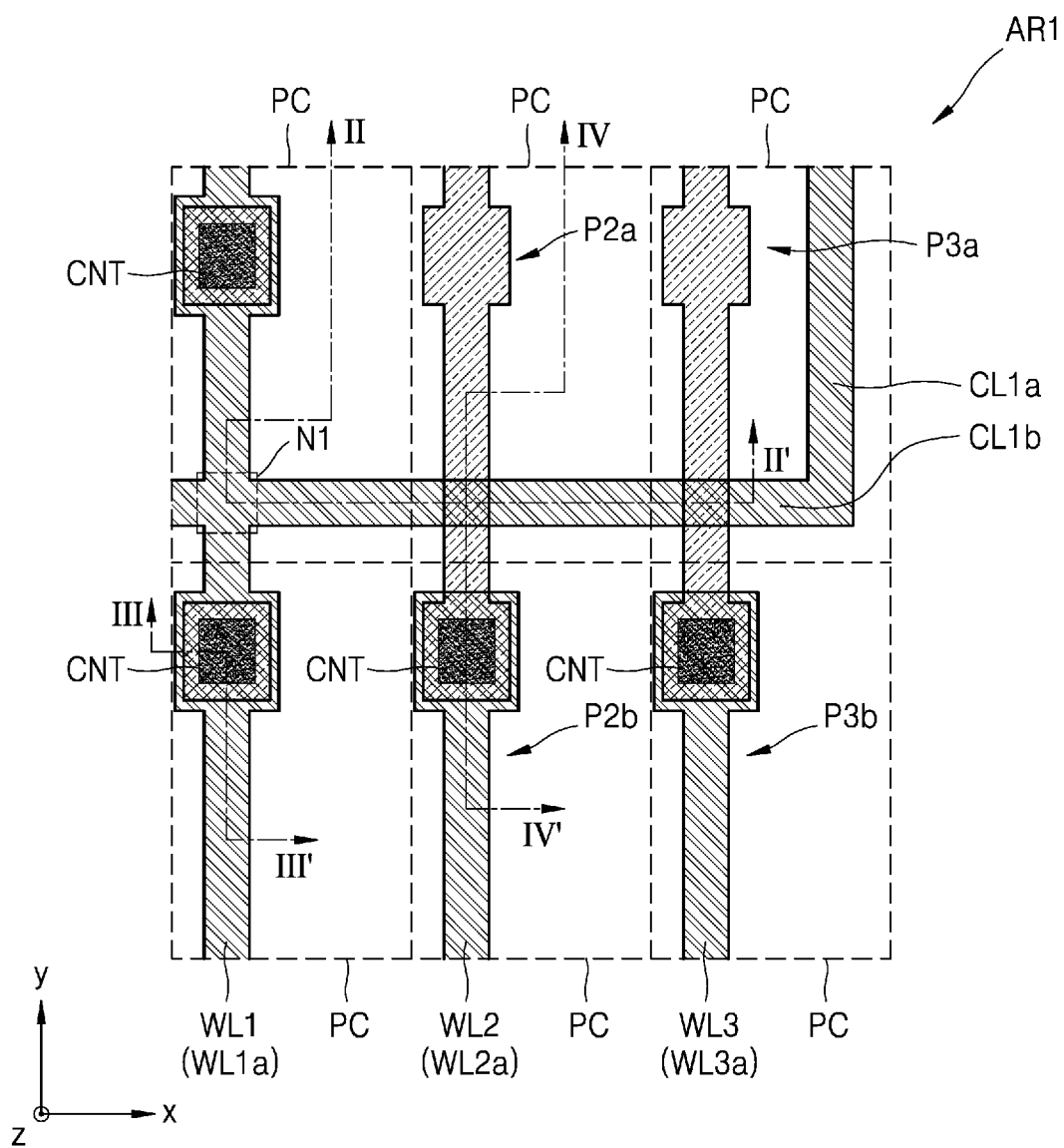
FIG. 7 is an enlarged plan view of a portion of FIG. 6.
Figure 8:
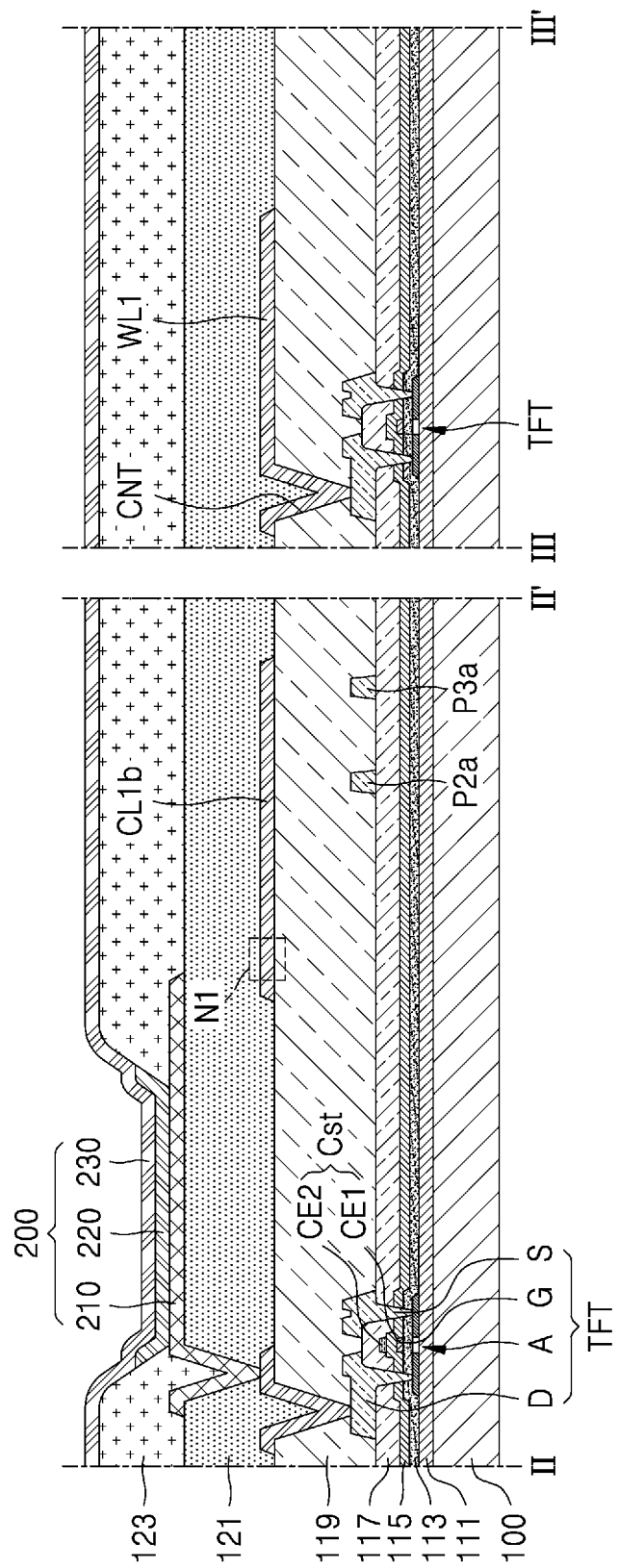
FIG. 8 is a cross-sectional view of a display apparatus taken along lines II-II' and III-III' of FIG. 7.
Figure 9:
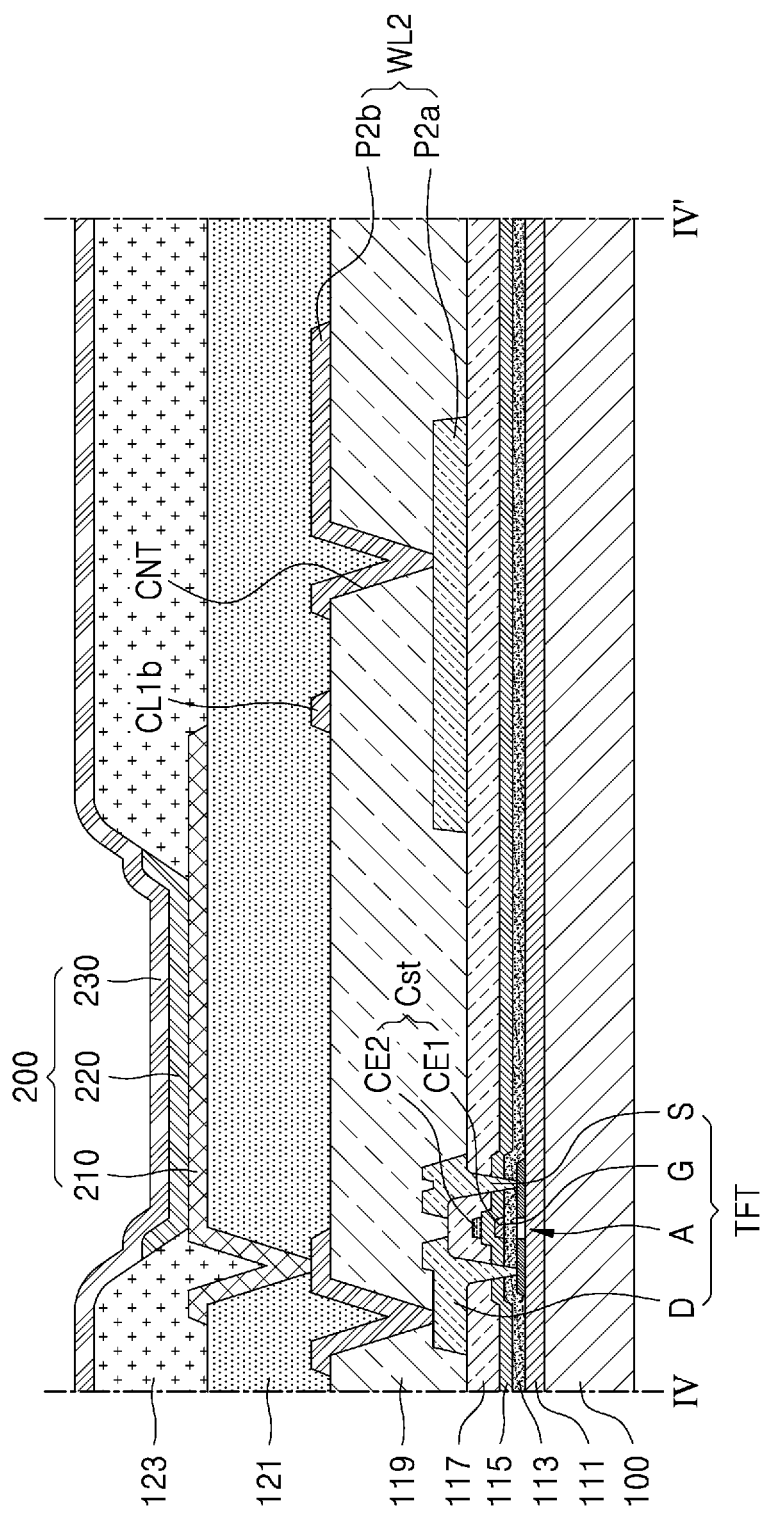
FIG. 9 is a cross-sectional view of a display apparatus taken along line IV-IV' of FIG. 7.

FIG. 7 is an enlarged plan view schematically showing a first area AR1 of FIG. 6, FIG. 8 is a cross-sectional view of a display apparatus taken along lines II-II' and III-III' of FIG. 7, and FIG. 9 is a cross-sectional view of a display apparatus taken along a line IV-IV' of FIG. 7.

Referring to FIG. 7, the first to third wires WL1, WL2, and WL3 extend in a first direction (e.g., a y direction) and are arranged to overlap a plurality of pixel circuits PC. FIG. 7 is an enlarged first area AR1 of FIG. 6 and shows six pixel circuits PC, but this is only an example. The first area AR1 may include more than six pixel circuits PC.

The first wire WL1 according to an embodiment of the present invention extends in the first direction (e.g., the y direction), and includes the first-1 wire WL1a and first-2 wire WL1b (see FIG. 6) that are spaced apart from each other by the transmission area TA. The first-1 wire WL1a and the first-2 wire WL1b are connected to each other by the first connecting wire CL1 arranged on the same layer as that of the first wire WL1.

In an embodiment of the present invention, the first connecting wire CL1 may include a first-1 connecting wire CL1a extending in the first direction (e.g., the y direction), a first-2 connecting wire CL1b extending in a second direction (e.g., an x direction) crossing the first direction, and a first-3 connecting wire CL1c (see FIG. 6) extending in a third direction crossing the first direction. The first-2 connecting wire CL1b is connected to one end of the first-1 connecting wire CL1a, and the first-3 connecting wire CL1c is connected to the other end of the first-1 connecting wire CL1a. For example, different portions of the first-1 connecting wire CL1a intersect with the first-2 connecting wire CL1b and the first-3 connecting wire CL1c. The first-1 connecting wire CL1a, the first-2 connecting wire CL1b, and the first-3 connecting wire CL1c may be integrally formed. In FIG. 7, the first-1 connecting wire CL1a and the first-2 connecting wire CL1b are vertically crossed, but this is only an embodiment of the present invention. An angle formed by the first-1 connecting wire CL1a and the first-2 connecting wire CL1b may vary. For example, as illustrated in FIG. 6, an angle formed by the first-1 connecting wire CL1a and the first-2 connecting wire CL1b may be greater than 90 degrees. Although the first connecting wire CL1 has been described as a reference, the same description applies to the second connecting wire CL2 and the third connecting wire CL3.

For example, the first-2 connecting wire CL1b is in contact with the first-1 wire WL1a, and a portion of the first-2 connecting wire CL1b that is in contact with the first-1 wire WL1a is the first node N1. The first-3 connecting wire CL1c is in contact with the first-2 wire WL1b, and a portion of the first-3 connecting wire CL1c that is in contact with the first-2 wire WL1b is the second node N2 (see FIG. 6).

In an embodiment of the present invention, a second-1 portion P2a of the second wire WL2 corresponding to any one pixel circuit PC may at least partially overlap the first connecting wire CL1, and the second-1 portion P2a may be arranged on a different layer from those of the first wire WL1 and the first connecting wire CL1. In addition, a second-2 portion P2b of the second wire WL2 corresponding to any one pixel circuit PC does not overlap the first connecting wire CL1, and may be arranged on the same layer as those of the first wire WL1 and the first connecting wire CL1. For example, the second wire WL2 may be divided into the second-1 portion P2a and the second-2 portion P2b arranged on different layers in units of the pixel circuits PC. For example, the second-1 wire WL2a may be divided into the second-1 portion P2a and the second-2 portion P2b, and the second-2 wire WL2b may have a similar configuration to that of the second-1 wire WL2a.

The second-1 portion P2a extends in the first direction (e.g., the y direction), and may partially overlap the second-2 portion P2b. The second-1 portion P2a and the second-2 portion P2b may be connected to each other through a contact hole CNT, and the same signal may be applied to the second-1 portion P2a and the second-2 portion P2b.

The third wire WL3 may be similar to the second wire WL2. A third-1 portion P3a of the third wire WL3 corresponding to any one pixel circuit PC may at least partially overlap the first connecting wire CL1, and the third-1 portion P3a may be arranged on a different layer from those of the first wire WL1 and the first connecting wire CL1. In addition, a third-2 portion P3b of the third wire WL3 corresponding to any one pixel circuit PC does not overlap the first connecting wire CL1, and may be arranged on the same layer as those of the first wire WL1 and the first connecting wire CL1. For example, the third wire WL3 may be divided into the third-1 portion P3a and the third-2 portion P3b arranged on different layers in units of the pixel circuits PC.

The third-1 portion P3a extends in the first direction (e.g., the y direction), and may partially overlap the third-2 portion P3b. The third-1 portion P3a and the third-2 portion P3b may be connected to each other through the contact hole CNT, and the same signal may be applied to the third-1 portion P3a and the third-2 portion P3b.

As such, the first to third wires WL1, WL2, and WL3 are not connected to each other, and different signals may be applied to the first to third wires WL1, WL2, and WL3.

Hereinafter, display elements and elements electrically connected thereto will be described in more detail with reference to FIGS. 8 and 9 according to a stacking order, and the positional relationship of the first to third wires WL1, WL2, and WL3, the first connecting wire CL1, and the like will be described.

The substrate 100 may include, for example, glass or a polymer resin. The polymer resin may include polyethersulphone, polyacrylate, polyetherimide, polyethylene naphthalate, polyethylene terephthalate, polyphenylene sulfide, polyarylate, polyimide, polycarbonate, or cellulose acetate propionate. The substrate 100 including the polymer resin may be flexible, rollable, or bendable. The substrate 100 may have a multilayer structure including a layer including the above-described polymer resin and an inorganic layer. However, the present invention is not limited thereto. For example, the substrate 100 may be a single layer.

A buffer layer 111 may reduce or block the penetration of foreign materials, moisture, or external air from a lower portion of the substrate 100 and may provide a flat surface on the substrate 100. The buffer layer 111 may include an inorganic material, such as an oxide or nitride, an organic material, or an organic-inorganic composite material, and may have a single layer structure or a multilayer structure including an inorganic material and/or an organic material.

A barrier layer may be further included between the substrate 100 and the buffer layer 111. The barrier layer may prevent or minimize penetration of impurities from the substrate 100 into a semiconductor layer A. The barrier layer may include an inorganic material, such as an oxide or nitride, an organic material, or an organic-inorganic composite material, and may have a single layer structure or a multilayer structure including an inorganic material and/or an organic material.

A semiconductor layer A may be on the buffer layer 111. The semiconductor layer A may include, for example, amorphous silicon or polysilicon. In an embodiment of the present invention, the semiconductor layer A may include an oxide of at least one of indium (In), gallium (Ga), tin (Sn), zirconium (Zr), vanadium (V), hafnium (Hf), cadmium (Cd), germanium (Ge), chromium (Cr), titanium (Ti), aluminum (Al), cesium (Cs), cerium (Ce), and/or zinc (Zn).

The semiconductor layer A may include a channel area and a source area and a drain area arranged on both sides of the channel area. The semiconductor layer A may be a single layer or multiple layers.

A first gate insulating layer 113 and a second gate insulating layer 115 may be stacked and arranged on the substrate 100 to cover the semiconductor layer A. The first gate insulating layer 113 and the second gate insulating layer 115 may include, for example, silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), and/or zinc oxide ($ZnO_2$).

A gate electrode G may be arranged on the first gate insulating layer 113 to at least partially overlap the semiconductor layer A. Although the drawing shows that the gate electrode G is arranged on the first gate insulating layer 113, in an embodiment of the present invention, the gate electrode G may be arranged on an upper surface of the second gate insulating layer 115.

In an embodiment of the present invention, the storage capacitor Cst includes a lower electrode CE1 and an upper electrode CE2 and may overlap a thin-film transistor TFT, as illustrated in FIG. 8. For example, the gate electrode G of the thin film transistor TFT may serve as the lower electrode CE1 of the storage capacitor Cst. In addition, the storage capacitor Cst might not overlap the thin film transistor TFT and may exist separately.

The upper electrode CE2 of the storage capacitor Cst overlaps the lower electrode CE1 with the second gate insulating layer 115 therebetween and forms a capacitance. Here, the second gate insulating layer 115 may serve as a dielectric layer of the storage capacitor Cst.

An interlayer insulating layer 117 may be provided on the second gate insulating layer 115 to cover the upper electrode CE2 of the storage capacitor Cst. The interlayer insulating layer 117 includes, for example, $SiO_2$, $SiN_x$, SiON, $Al_2O_3$, $TiO_2$, $Ta_2O_5$, $HfO_2$, and/or $ZnO_2$.

A source electrode S, a drain electrode D, the second-1 portion P2a of the second wire WL2, and the third-1 portion P3a of the third wire WL3 may be arranged on the interlayer insulating layer 117.

The source electrode S, the drain electrode D, the second-1 portion P2a of the second wire WL2, and the third-1 portion P3a of the third wire WL3 may include a conductive material including, for example, molybdenum (Mo), aluminum (Al), copper (Cu), titanium (Ti), or the like, and may be formed as a single layer or multiple layers including the above-described materials. For example, the source electrode S, the drain electrode D, the second-1 portion P2a of the second wire WL2, and the third-1 portion P3a of the third wire WL3 may be formed of a multilayer structure of Ti/Al/Ti. The source electrode S and the drain electrode D may be connected to the source area or the drain area of the semiconductor layer A through a contact hole.

The source electrode S and the drain electrode D may be covered with an inorganic protective layer. For example, the inorganic protective layer may be a single layer or multiple layers of $SiN_x$ and silicon oxide ($SiO_x$). The inorganic protective layer may be introduced to cover and protect some wires on the interlayer insulating layer 117.

A first planarization layer 119 and a second planarization layer 121 are sequentially arranged to cover the source electrode S and the drain electrode D, and the first planarization layer 119 and the second planarization layer 121 include contact holes for connecting the thin film transistor TFT to a pixel electrode 210. In addition, the first planarization layer 119 includes the contact hole CNT for connecting the thin-film transistor TFT to the first wire WL1.

The first planarization layer 119 and the second planarization layer 121 may include a single layer or multiple layers of an organic material, and provide a flat top surface. The first planarization layer 119 and the second planarization layer 121 may include a general purpose polymer such as benzocyclobutene (BCB), polyimide, hexamethyldisiloxane (HMDSO), polymethylmethacrylate (PMMA), and polystyrene (PS), a polymer derivative including a phenolic group, an acrylic polymer, an imide polymer, an aryl ether polymer, an amide polymer, a fluorine-based polymer, a p-xylene-based polymer, a vinyl alcohol polymer, or a blend thereof.

The first wire WL1 and the first connecting wire CL1 are arranged on the first planarization layer 119. For example, the first-2 connecting wire of the first connecting wire CL1 may be arranged on the first planarization layer 119. The first wire WL1 is connected to the thin film transistor TFT through the contact hole CNT formed in the first planarization layer 119 and may be driven.

A display device 200 is arranged on the second planarization layer 121. The display device 200 includes a pixel electrode 210, an intermediate layer 220 including an organic light-emitting layer, and an opposite electrode 230.

The pixel electrode 210 may include, for example, a (semi-) transparent electrode or a reflective electrode. In an embodiment of the present invention, the pixel electrode 210 may include a reflective layer formed of silver (Ag), magnesium (Mg), aluminum (Al), platinum (Pt), palladium (Pd), gold (Au), nickel (Ni), neodymium (Nd), iridium (Ir), chromium (Cr), or a compound thereof. In addition, the pixel electrode 210 may include a transparent or semi-transparent electrode layer formed above the reflective layer. The transparent or semi-transparent electrode layer may include at least one of indium tin oxide (ITO), indium zinc oxide (IZO), zinc oxide (ZnO), indium oxide ($In_2O_3$), indium gallium oxide (IGO), and/or aluminum zinc oxide (AZO). In an embodiment of the present invention, the pixel electrode 210 may be formed of ITO/Ag/ITO.

In the display area DA of the substrate 100, a pixel-defining layer 123 may be on the second planarization layer 121, and may include an opening overlapping the pixel electrode 210. In addition, the pixel-defining layer 123 may prevent generation of an arc on edges of the pixel electrode 210 by increasing a distance between the edges of the pixel electrode 210 and the opposite electrode 230 on the pixel electrode 210. In addition, the opposite electrode 230 may be disposed on the pixel-defining layer 123.

The pixel-defining layer 123 may include at least one organic insulating material from among polyimide, polyamide, acrylic resin, BCB, and/or phenolic resin, and may be formed by spin coating or the like.

The intermediate layer 220 is in the opening formed in the pixel-defining layer 123 and may include an organic light-emitting layer. The organic light-emitting layer may include an organic material including a fluorescent or phosphorescent material that emits red, green, blue, or white light. The organic light-emitting layer may include a low-molecular weight organic material or a high-molecular weight organic material. A functional layer such as a hole transport layer (HTL), a hole injection layer (HIL), an electron transport layer (ETL), or an electron injection layer (EIL) may selectively be further arranged over and below the organic light-emitting layer.

The opposite electrode 230 may include a transparent electrode or a reflective electrode. In an embodiment of the present invention, the opposite electrode 230 may include a transparent electrode or semi-transparent electrode, and may include a metal thin-film, which has a small work function, including, for example, Li, Ca, lithium fluoride (LiF)/Ca, LiF/Al, Al, Ag, Mg, or a compound thereof. Furthermore, a transparent conductive oxide (TCO) layer including such as ITO, IZO, ZnO, or $In_2O_3$ may further be arranged on the metal thin-film. The opposite electrode 230 may be arranged over the display area DA and may be on the intermediate layer 220 and the pixel-defining layer 123. The opposite electrode 230 may be formed integrally with a plurality of organic light-emitting diodes OLED to correspond to the plurality of pixel electrodes 310.

Because the organic light-emitting diodes OLED may be easily damaged by moisture or oxygen from the outside, an encapsulation layer may cover and protect the OLED. The encapsulation layer covers the display area DA and may extend to at least a portion of the non-display area NDA. The encapsulation layer may include a first inorganic encapsulation layer, an organic encapsulation layer, and a second inorganic encapsulation layer.

In an embodiment of the present invention, as illustrated in FIG. 8, the first-2 connecting wire CL1b is arranged on the same layer as that of the first wire WL1. For example, the first connecting wire CL1 and the first wire WL1 are both arranged on the first planarization layer 119.

A second-1 portion P2a of the second wire WL2 corresponding to any one pixel circuit PC may at least partially overlap the first connecting wire CL1, and the second-1 portion P2a may be arranged on a different layer from those of the first wire WL1 and the first connecting wire CL1. For example, the second-1 portion P2a may overlap the first-2 connecting wire of the first connecting wire CL1. For example, as shown in FIGS. 8 and 9, the second-1 portion P2a may be on the interlayer insulating layer 117, and the first connecting wire CL1 may be on the first planarization layer 119.

In addition, the second-2 portion P2b of the second wire WL2 corresponding to any one pixel circuit PC does not overlap the first connecting wire CL1, and may be arranged on the same layer as those of the first wire WL1 and the first connecting wire CL1. For example, as shown in FIGS. 8 and 9, both the second-2 portion P2b and the first connecting wire CL1 may be on the first planarization layer 119. As such, the second wire WL2 may be divided into the second-1 portion P2a and the second-2 portion P2b arranged on a different layer from that of the second-1 portion P2a, in units of the pixel circuits PC.

Also, the second-1 portion P2a may partially overlap the second-2 portion P2b. The second-2 portion P2b may be buried in the contact hole CNT formed in the first planarization layer 119 to be connected to the second-1 portion P2a, and the same signal may be applied to the second-2 portion P2b and the second-1 portion P2a.

The third wire WL3 may be applied similarly to the second wire WL2. A third-1 portion P3a of the third wire WL3 corresponding to any one pixel circuit PC may at least partially overlap the first connecting wire CL1, and the third-1 portion P3a may be arranged on a different layer from those of the first wire WL1 and the first connecting wire CL1. For example, as shown in FIG. 8, the third-1 portion P3a may be on the interlayer insulating layer 117, and the first connecting wire CL1 may be on the first planarization layer 119.

In addition, the third-2 portion P3b of the third wire WL3 corresponding to any one pixel circuit PC does not overlap the first connecting wire CL1, and may be arranged on the same layer as those of the first wire WL1 and the first connecting wire CL1. For example, both the third-2 portion P3b and the first connecting wire CL1 may be on the first planarization layer 119. As such, the third wire WL3 may be divided into the third-1 portion P3a and the third-2 portion P3b arranged on a different layer from that of the third-1 portion P3a, in units of the pixel circuits PC.

In addition, the third-1 portion P3a may partially overlap the third-2 portion P3b. The third-2 portion P3b may be buried in the contact hole CNT formed in the first planarization layer 119 to be connected to the third-1 portion P3a, and the same signal may be applied to the third-2 portion P3b and the third-1 portion P3a.

In an embodiment of the present invention, the first to third wires WL1, WL2, and WL3 are the data line DL (see FIG. 4), and may be arranged on different layers from those of the source electrode S and the drain electrode D of the thin film transistor TFT. In this case, a parasitic capacitance of the data line DL may be reduced because the data line DL is moved away from a lower conductive layer. Accordingly, a pulse width of a scan signal may be reduced. Therefore, the data writing time may be reduced, and accordingly, a light emission duty may be increased. In addition, because a driving frequency may be increased, high-speed driving is possible.

In addition, as described above with reference to FIG. 6, because the first wire WL1 includes the first-1 wire WL1a and the first-2 wire WL1b that are spaced apart from each other by the transmission area TA, there is no need for the first wire WL1 to bypass along an edge of the transmission area TA. For example, the first non-display area NDA1 surrounding the transmission area TA may be reduced.

Figure 10:
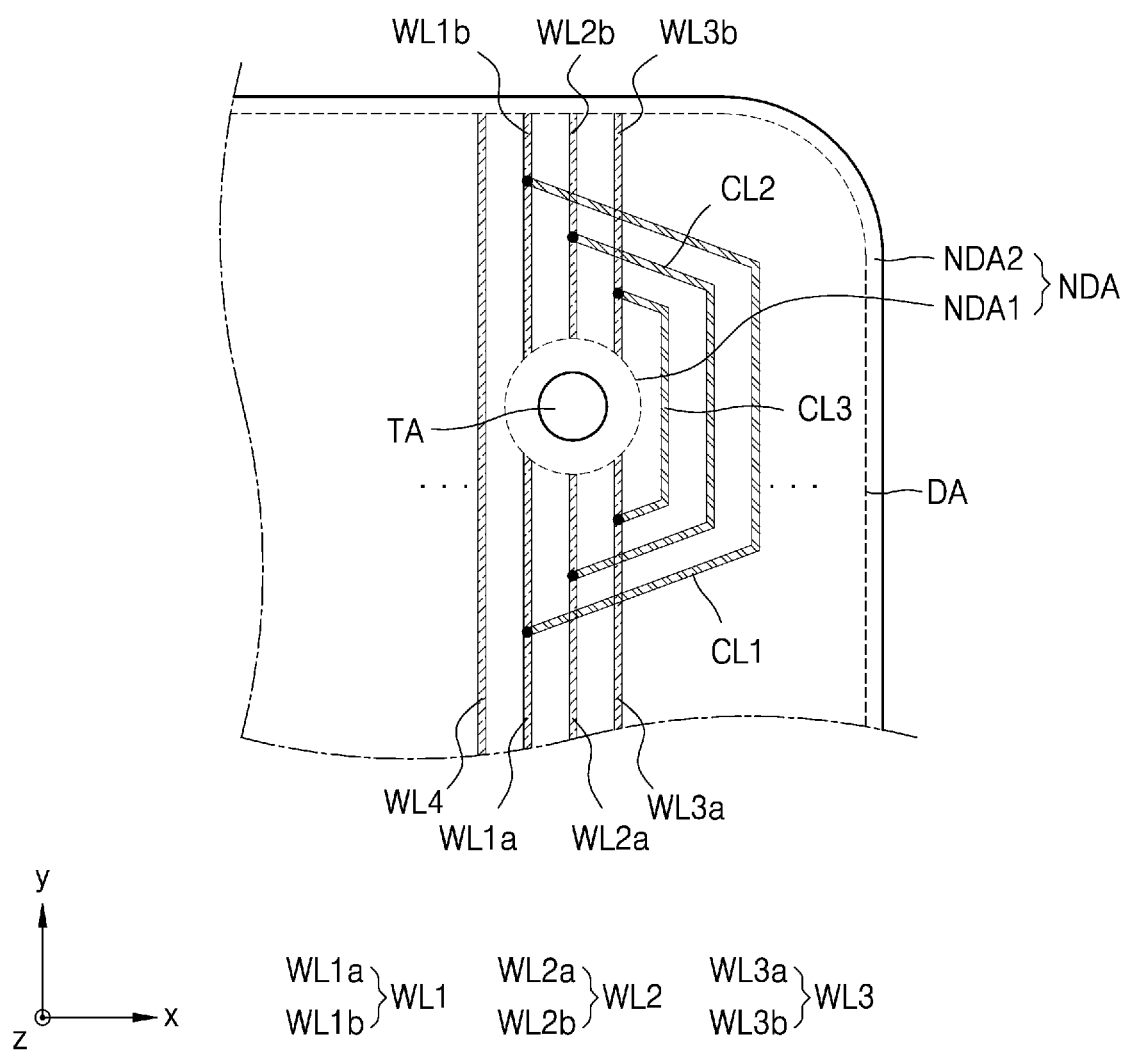
FIG. 10 is a plan view of a portion of a display apparatus according to another embodiment.
Figure 11:
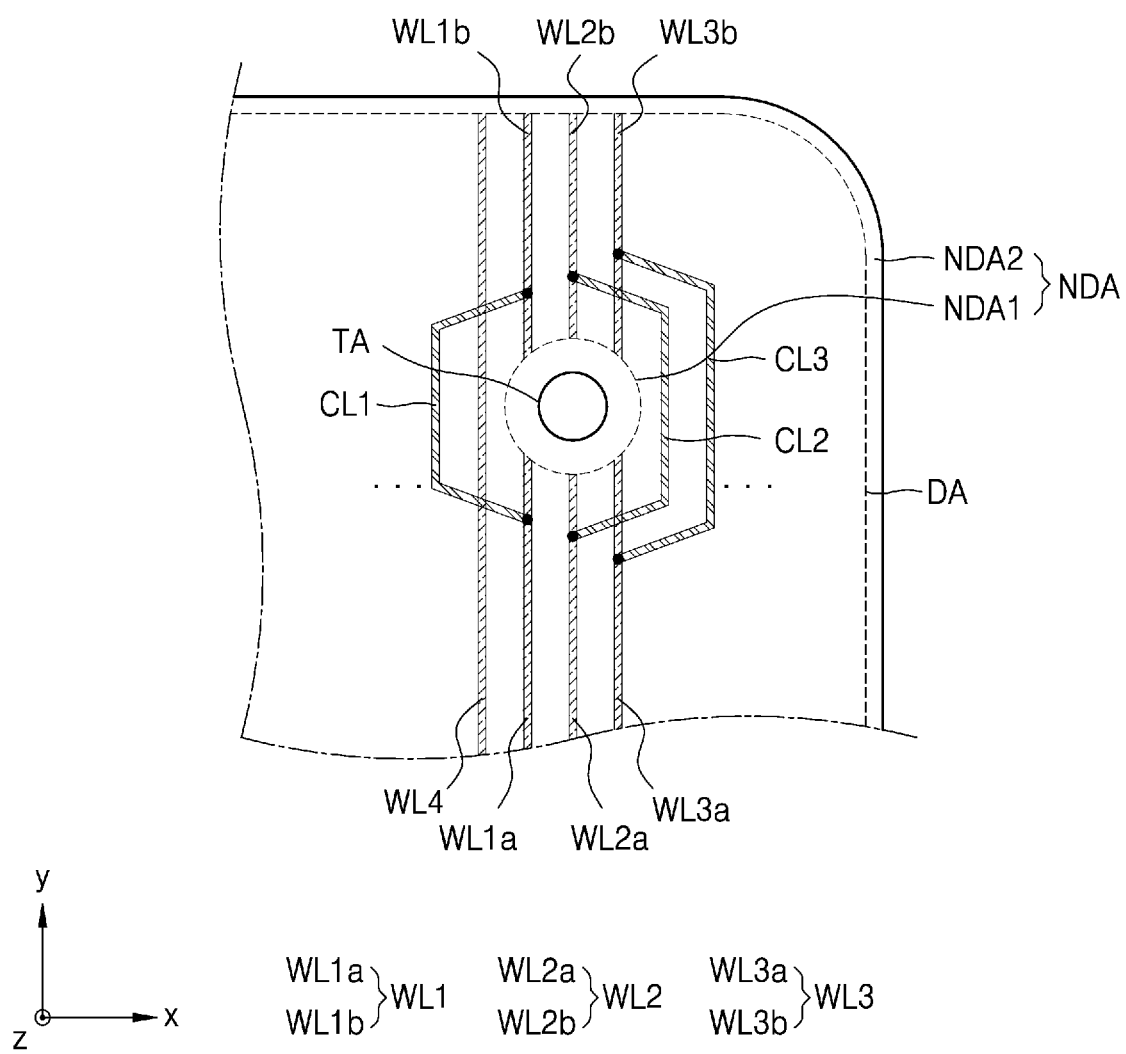
FIG. 11 is a plan view of a portion of a display apparatus according to an embodiment of he present invention.
Figure 12:
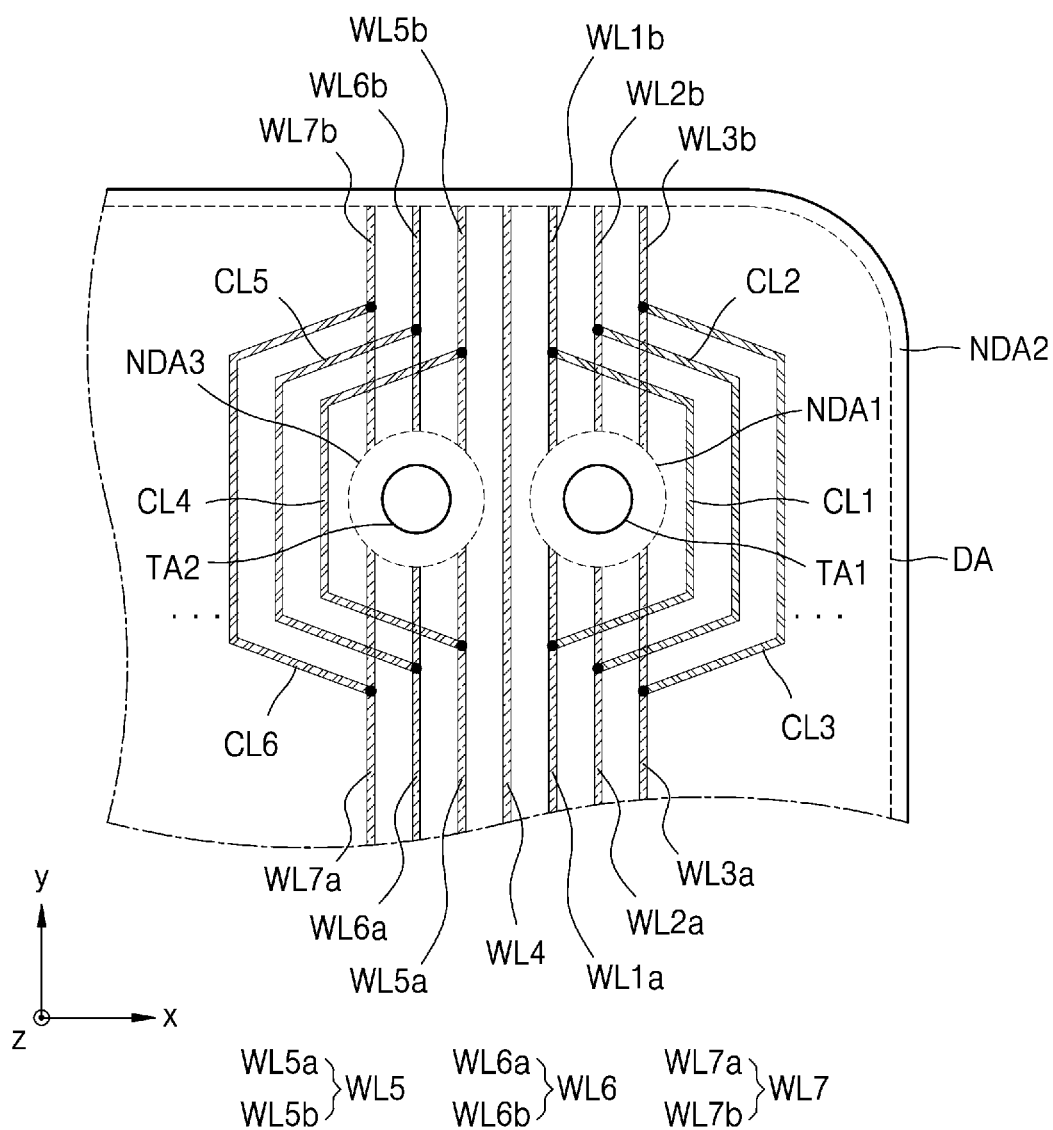
FIG. 12 is a plan view of a portion of a display apparatus according to an embodiment of the present invention.

FIGS. 10 to 12 are plan views of a portion of a display apparatus according to an embodiment of the present invention. FIGS. 10 to 12 correspond to some modified embodiments of FIG. 6 and will be described below based on differences from FIG. 6. Thus, any redundant descriptions may be omitted.

Referring to FIG. 10, the distance from the transmission area TA to the second connecting wire CL2 may be shorter than the distance between the transmission area TA and the first connecting wire CL1. In addition, the distance from the transmission area TA to the third connecting wire CL3 may be shorter than the distance between the second connecting wire CL2 and the transmission area TA. For example, the first connecting wire CL1 may be arranged farthest from the transmission area TA, and the third connecting wire CL3 may be arranged closest to the transmission area TA. The second connecting wire CL2 may be arranged between the first connecting wire CL1 and the third connecting wire CL3.

Referring to FIG. 11, the first to third connecting wires CL1, CL2, and CL3 may be arranged in different directions based on the transmission area TA. The first connecting wire CL1 is arranged on the left side based on the transmission area TA, and the second connecting wire CL2 and the third connecting wire CL3 may be respectively arranged on the right side based on the transmission area TA. For example, the first connecting wire CL1 is arranged closer to a left side of the display apparatus than the second and third connecting wires CL2 and CL3 are, and the second and third connecting wires CL2 and CL3 are arranged closer to the right side of the display apparatus than the first connecting wire CL1 is. As another example, the transmission area TA may be provided between the first connecting line CL1 and the second and third connecting lines CL2 and CL3. As another example, the first connecting wire CL1 and the third connecting wire CL3 are respectively arranged on the left side based on the transmission area TA, and the second connecting wire CL2 may be arranged on the right side based on the transmission area TA. In addition, the first to third connecting wires CL1, CL2, and CL3 may be freely arranged on the left or right side based on the transmission area TA.

Referring to FIG. 12, the transmission area TA may include a first transmission area TA1 and a second transmission area TA2 that are spaced apart from each other. Accordingly, the display apparatus 1 may include the first non-display area NDA1 and a third non-display area NDA3. The first non-display area NDA1 surrounds the first transmission area TA1, and the third non-display area NDA3 surrounds the second transmission area TA2.

The first wire WL1 includes the first-1 wire WL1a and the first-2 wire WL1b that are spaced apart from each other by the first transmission area TA1. In addition, the second wire WL2 includes the second-1 wire WL2a and the second-2 wire WL2b that are spaced apart from each other by the first transmission area TA1, and the third wire WL3 includes the third-1 wire WL3a and the third-2 wire WL3b that are spaced apart from each other by the first transmission area TA1. As described above with reference to FIG. 6, the fourth wire WL4 does not partially overlap the transmission area TA. Therefore, the fourth wire WL4 may be integrally formed without a portion disconnected or separated by the transmission area TA. The first connecting wire CL1 connects the first-1 wire WL1a to the first-2 wire WL1b, and the second connecting wire CL2 connects the second-1 wire WL2a to the second-2 wire WL2b. In addition, the third connecting wire CL3 connects the third-1 wire WL3a to the third-2 wire WL3b.

Like the first to third wires WL1, WL2, and WL3, a fifth wire WL5 includes a fifth-1 wire WL5a and a fifth-2 wire WL5b that are spaced apart from each other by the second transmission area TA2. Further, a sixth wire WL6 includes a sixth-1 wire WL6a and a sixth-2 wire WL6b that spaced are apart from each other by the second transmission area TA2, and a seventh wire WL7 includes a seventh-1 wire WL7a and a seventh-2 wire WL7b that are spaced apart from each other by the second transmission area TA2. A fourth connecting wire CL4 connects the fifth-1 wire WL5a to the fifth-2 wire WL5b, and a fifth connecting wire CL5 connects the sixth-1 wire WL6a to the sixth-2 wire WL6b. Further, a sixth connecting wire CL6 connects the seventh-1 wire WL7a to the seventh-2 wire WL7b.

In an embodiment of the present invention, as shown in FIG. 12, the first to third connecting wires CL1, CL2, and CL3 may be arranged to be separated from the second transmission area TA2, and the fourth to sixth connecting wires CL4, CL5, and CL6 may be arranged to be separated from the first transmission area TA1. For example, the first to third connecting wires CL1, CL2, and CL3 may be arranged on the right side based on the first transmission area TA1, and the fourth to sixth connecting wires CL4, CL5, and CL6 may be arranged on the left side based on the second transmission area TA2. For example, the first and second transmission areas TA1 and TA2 may be provided between the first to third connecting wires CL1, CL2, and CL3 and the fourth to sixth connecting wires CL4, CL5, and CL6.

Figure 13:
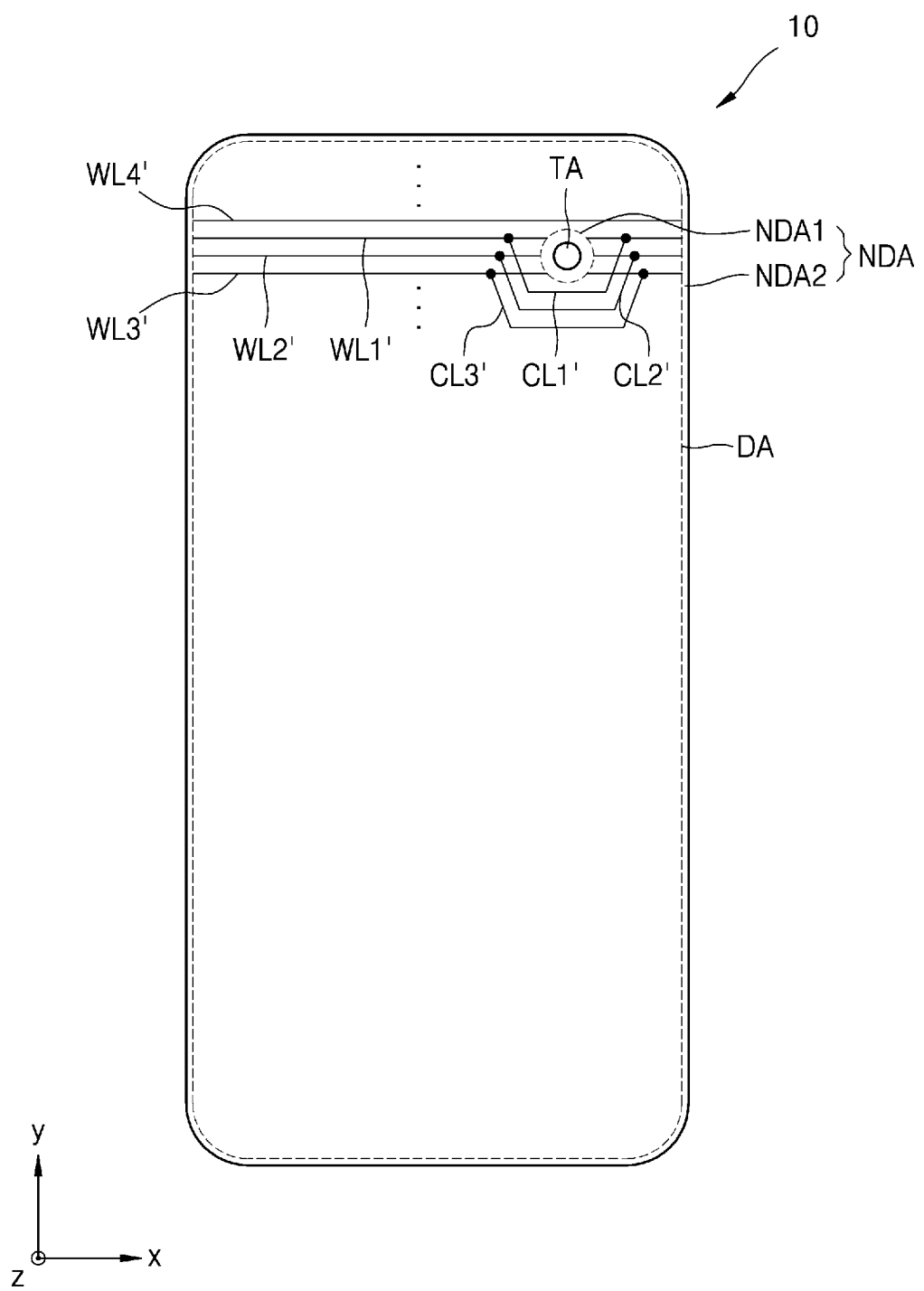
FIG. 13 is a diagram of a scan line of the display apparatus of FIG. 1.
Figure 14:
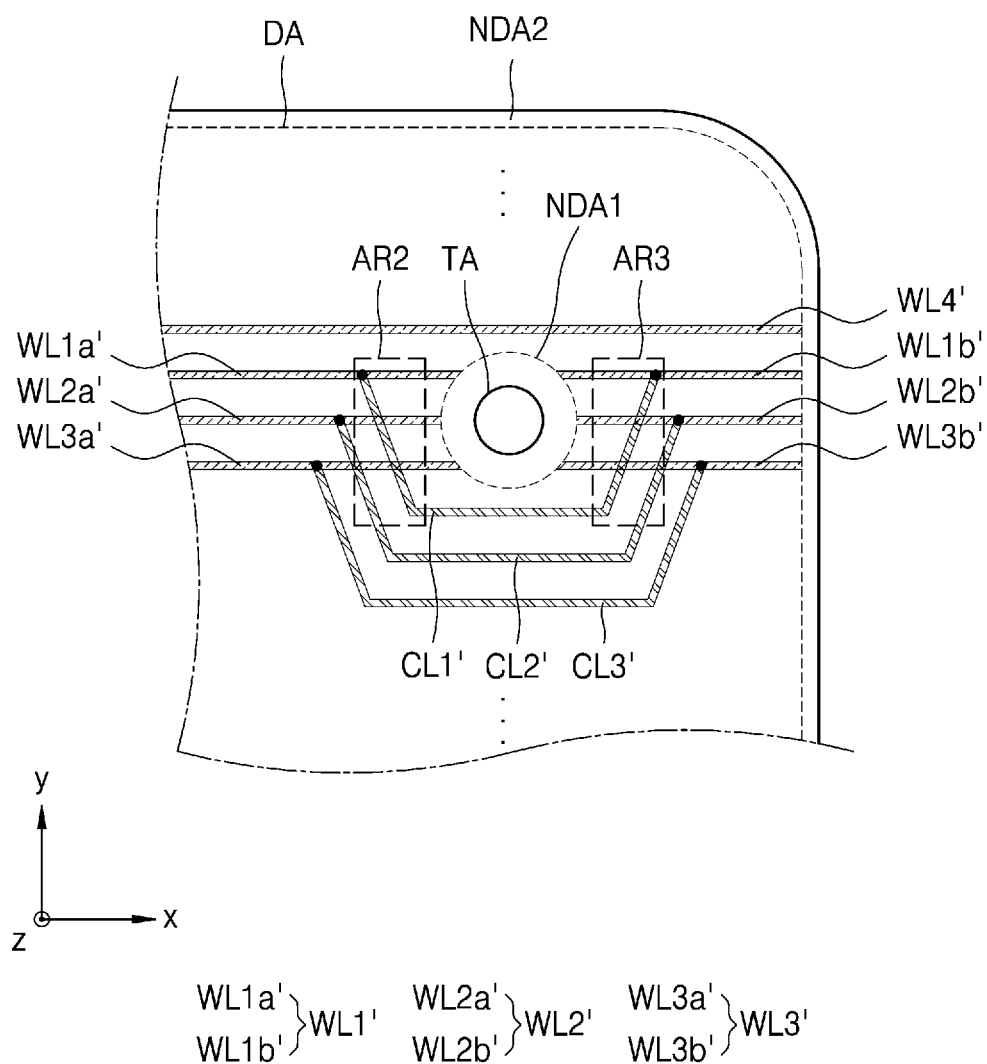
FIG. 14 is an enlarged plan view of a portion of FIG. 13.

FIG. 13 is a diagram schematically showing a scan line of the display apparatus of FIG. 1, and FIG. 14 is an enlarged plan view schematically showing a portion of FIG. 13.

Various signals may be applied to the display area DA. For example, a scan signal or the like for adjusting the brightness in each pixel may be applied to the display area DA, and for this purpose, as schematically illustrated in FIG. 13, first to fourth wires WL1', WL2', WL3', and WL4' that are substantially parallel to each other may be located inside and outside of the display area DA on the substrate 100. In an embodiment of the present invention, the first to fourth wires WL1', WL2', WL3', and WL4' may be the scan lines SL described above with reference to FIGS. 3 and 4. In an embodiment of the present invention, in a display apparatus with reference to FIGS. 5 and 13, the first to fourth wires WL1', WL2', WL3' and WL4' may cross the first to fourth wires WL1, WL2, WL3, and WL4. FIG. 13 shows only wires adjacent to the transmission area TA, so that the display panel 10 includes four wires, but this is only an example and the display area DA may include more than four wires.

The first wire WL1' extends in a first direction (e.g., an x direction). The first wire WL1' includes a first-1 wire WL1a' and a first-2 wire WL1b' that are spaced apart from each other by the transmission area TA. The first-2 wire WL1b' is arranged to coincide with a virtual line extending in the first direction from the first-1 wire WL1a'. For example, the virtual line extending in the first direction from the first-1 wire WL1a' and a virtual line extending in the first direction from the first-2 wire WL1b' coincide with each other. The first wire WL1' may be integrally formed and then disconnected as the transmission area TA is formed, thereby forming the first-1 wire WL1a' and the first-2 wire WL1b'. As another example, the first-1 wire WL1a'. and the first-2 wire WL1b' may be formed by patterning.

The second wire WL2' extends in the first direction in the same manner as the first wire WL1', and includes a second-1 wire WL2a' and a second-2 wire WL2b' that are spaced apart from each other by the transmission area TA. The third wire WL3' also extends in the first direction in the same manner as the first wire WL1' and the second wire WL2' and includes a third-1 wire WL3a' and a third-2 wire WL3b' that are spaced apart from each other by the transmission area TA. The description of the second wire WL2' and the third wire WL3' may be substantially the same as the first wire WL1'.

Unlike the first to third wires WL1', WL2', and WL3', the fourth wire WL4' does not partially overlap the transmission area TA. Therefore, the fourth wire WL4' may be integrally formed without a portion disconnected or separated by the transmission area TA. Like the first to third wires WL1', WL2', and WL3', the fourth wire WL4' extends in the first direction.

The first to third connecting wires CL1', CL2', and CL3' are arranged on the substrate 100 corresponding to the display area DA. The first connecting wire CL1' connects the first-1 wire WL1a' to the first-2 wire WL1b' that are spaced apart from each other by the transmission area TA. For example, the first connecting wire CL1' may serve as a bridge connecting the first-1 wire WL1a' to the first-2 wire WL1b'. Likewise, the second connecting wire CL2' connects the second-1 wire WL2a' to the second-2 wire WL2b' that are spaced apart from each other by the transmission area TA, and the third connecting wire CL3' connects the third-1 wire WL3a' to the third-2 wire WL3b' that are spaced apart from each other by the transmission area TA.

Because the first to third wires WL1', WL2', and WL3' are respectively connected to different connecting wires, for example, the first to third connecting wires CL1', CL2', and CL3', the first to third wires WL1', WL2', and WL3' are not connected to each other. Therefore, different signals may be applied to the first to third wires WL1', WL2', and WL3'.

In an embodiment of the present invention, as illustrated in FIGS. 13 and 14, the distance from the transmission area TA to the second connecting wire CL2' may be longer in the than the distance between the first connecting wire CL1' and the transmission area TA. In addition, the distance from the transmission area TA to the third connecting wire CL3' may be longer than the distance between the second connecting wire CL2' and the transmission area TA. For example, the first connecting wire CL1' may be arranged closest to the transmission area TA, and the third connecting wire CL3' may be arranged farthest from the transmission area TA. The second connecting wire CL2' may be arranged between the first connecting wire CL1' and the third connecting wire CL3'. However, shapes in which the first to third connecting wires CL1', CL2', and CL3' are arranged may vary, and the ones illustrated in FIGS. 17 to 18 correspond to an embodiment of the present invention. This will be described in detail with reference to FIGS. 17 to 18.

According to an embodiment of the present invention, the first wire WL1' includes the first-1 wire WL1a' and the first-2 wire WL1b' that are spaced apart from each other by the transmission area TA, and the first-1 wire WL1a' and the first-2 wire WL1b' may be connected to each other by the first connecting wire CL1.

As a comparative example, a plurality of wires arranged adjacent to a transmission area of a display panel may be formed extending in a first direction and bypassing along an edge of the transmission area. Further, the plurality of wires are apart from each other at regular intervals, and are densely arranged when bypassing along the edge of the transmission area. Because the plurality of wires are densely arranged at the edge of the transmission area, a space in which a plurality of thin film transistors, a storage capacitor, and the like may be arranged is reduced, so that pixels cannot be formed. For example, the edge of the transmission area, in which the plurality of wires bypass, corresponds to a non-display area in which pixels are not arranged. Additional space is required to bypass a plurality of wires, and accordingly, a non-display area surrounding a transmission area is formed wide.

However, as in an embodiment of the present invention, the first wire WL1' may include the first-1 wire WL1a' and the first-2 wire WL1b' that are spaced apart from each other by the transmission area TA. In this case, the first wire WL1' does not need to bypass along the edge of the transmission area TA, and the first wire WL1' may be arranged to be adjacent to the transmission area TA. For example, the first non-display area NDA1 surrounding the transmission area TA may be reduced. In addition, because the first-1 wire WL1a' and the first-2 wire WL1b' are connected to each other by the first connecting wire CL1', the same signal may be applied to the first-1 wire WL1a' and the first-2 wire WL1b'.

Figure 15:
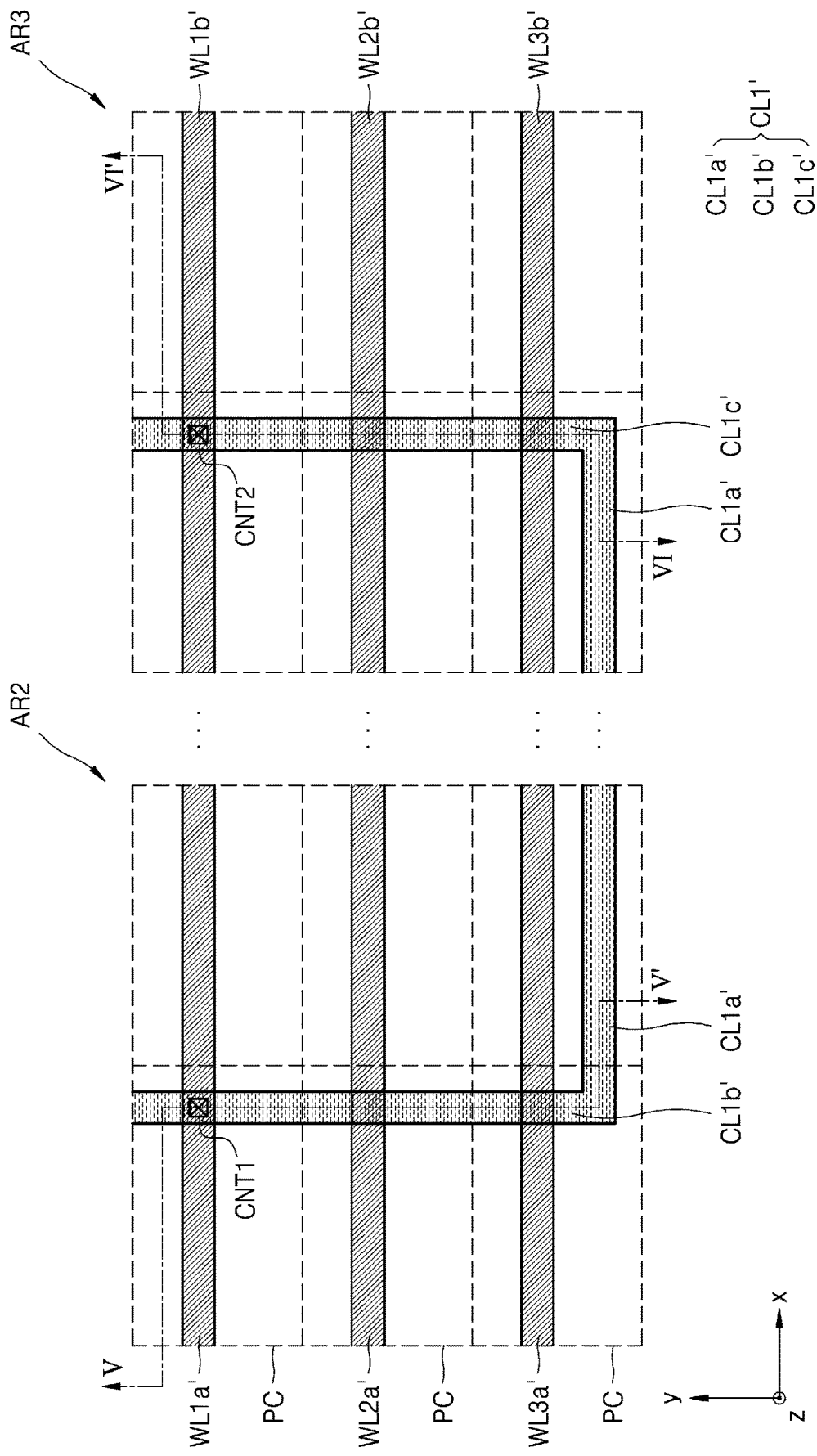
FIG. 15 is an enlarged plan view of a portion of FIG. 14.
Figure 16A:
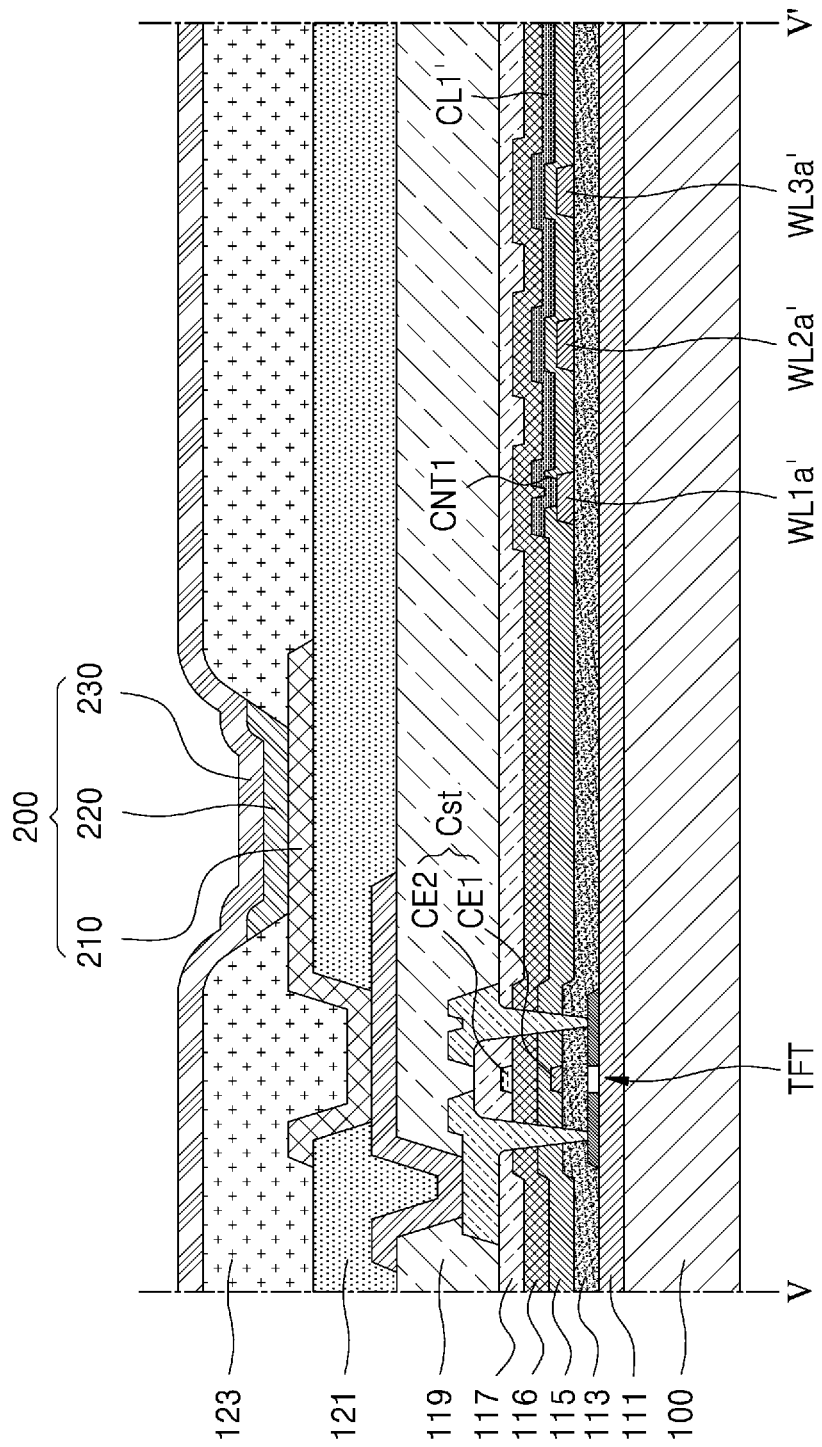
FIG. 16A is a cross-sectional view of a display apparatus taken along a line V-V' of FIG. 15.
Figure 16B:
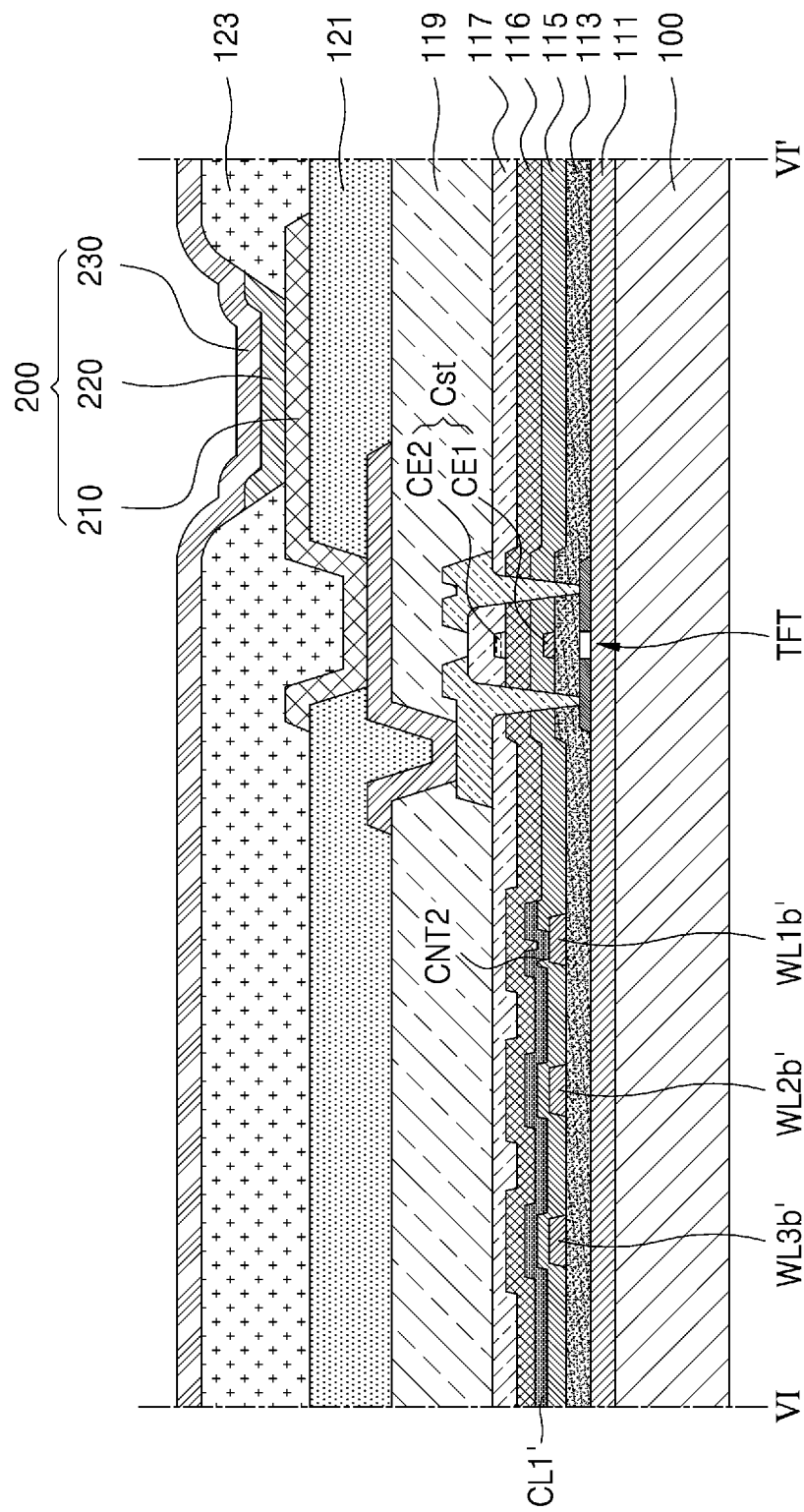
FIG. 16B is a cross-sectional view of the display apparatus taken along a line VI-VI' of FIG. 15.

FIG. 15 is an enlarged plan view of a portion of FIG. 14, FIG. 16A is a cross-sectional view of a display apparatus taken along a line V-V' of FIG. 15, and FIG. 16B is a cross-sectional view of the display apparatus taken along a line VI-VI' of FIG. 15. In FIGS. 15 and FIG. 16A and 16B, the same reference numerals as those in FIG. 8 denote the same elements, and a duplicate description thereof may not be given hereinafter.

Referring to FIG. 15, the first to third wires WL1', WL2', and WL3' extend in a first direction (e.g., an x direction) and are arranged to overlap the plurality of pixel circuits PC. FIG. 15 is an enlarged view of a second area AR2 and a third area AR3 of FIG. 14, and shows six pixel circuits PC in each area, but this is only an example. The second area AR2 may include more than six pixel circuits PC, and the third area AR3 may be the same.

The first wire WL1' according to an embodiment of the present invention extends in the first direction (e.g., the x direction), and includes the first-1 wire WL1a' and first-2 wire WL1b' that are spaced apart from each other by the transmission area TA. The first-1 wire WL1a' and the first-2 wire WL1b' are connected to each other by the first connecting wire CL1'.

Referring to FIGS. 16A and 16B, the second gate insulating layer 115 may be on the first gate insulating layer 113, and a third gate insulating layer 116 may be on the second gate insulating layer 115. The first to third wires WL1, WL2, and WL3 may be arranged on the first gate insulating layer 113, and the first connecting wire CL1' may be arranged on the second gate insulating layer 115, and the upper electrode CE2 of the storage capacitor Cst may be arranged on the third gate insulating layer 116. The third gate insulating layer 116 may include, for example, $SiO_2$, $SiN_x$, SiON, $Al_2O_3$, $TiO_2$, $Ta_2O_3$, $HfO_2$, or $ZnO_2$.

The second gate insulating layer 115 may include a first contact hole CNT1 and a second contact hole CNT2. For example, the first contact hole CNT1 partially exposes the first-1 wire WL1a', and the second contact hole CNT2 partially exposes the first-2 wire WL1b'. A portion of the first connecting wire CL1' may be buried in the first contact hole CNT1 and the second contact hole CNT2, respectively, to connect the first-1 wire WL1a' to the first-2 wire WL1b'.

In FIGS. 16A and 16B, the first connecting wire CL1' may be arranged on the second gate insulating layer 115, and the upper electrode CE2 of the storage capacitor Cst may be arranged on the third gate insulating layer 116. However, because the first connecting wire CL1' may be arranged on a different layer from those of the first to third wires WL1', WL2', and WL3', the first connecting wire CL1' may be arranged on the third gate insulating layer 116. As another example, the third gate insulating layer 116 may be omitted, and the first connecting wire CLI and the upper electrode CE2 of the storage capacitor Cst may be arranged on the second gate insulating layer 115.

In an embodiment of the present invention, the second and third connecting wires CL2' and CL3' may be disposed on the second gate insulating layer 115.

In an embodiment of the present invention, the first connecting wire CL1' may include a first-1 connecting wire CL1a' extending in a first direction (e.g., an x direction), a first-2 connecting wire CL1b' extending in a second direction (e.g., a y direction) crossing the first direction, and a first-3 connecting wire CL1c' extending in a third direction (e.g., also, a y direction) crossing the first direction. The first-2 connecting wire CL1b' is connected to one end of the first-1 connecting wire CL1a', and the first-3 connecting wire CL1c' is connected to the other end of the first-1 connecting wire CL1a'. For example, different portions of the first-1 connecting wire CL1a' intersect with the first-2 connecting wire CL1b' and the first-3 connecting wire CL1c'. The first-1 connecting wire CL1a', the first-2 connecting wire CL1b', and the first-3 connecting wire CL1c' may be integrally formed. In FIG. 15, the first-1 connecting wire CL1a' and the first-2 connecting wire CL1b' cross each other, but this is only an example. For example, an angle formed by the first-1 connecting wire CL1a' and the first-2 connecting wire CL1b' may vary. For example, as illustrated in FIG. 14, an angle formed by the first-1 connecting wire CL1a' and the first-2 connecting wire CL1b' may be greater than 90 degrees. Although the first connecting wire CL1' has been described as a reference, the same description applies to the second connecting wire CL2' and the third connecting wire CL3'.

In an embodiment of the present invention, a portion of the first-2 connecting wire CL1b' may be buried in the first contact hole CNT1 to contact the first-1 wire WL1a', and a portion of the first-3 connecting wire CL1c' may be buried in the second contact hole CNT2 to contact the first-2 wire WL1b'. The first-1 wire WL1a' and the first-2 wire WL1b' may be connected to each other through the first contact hole CNT1 and the second contact hole CNT2. The same signal may be applied to the first-1 wire WL1a' and the first-2 wire WL1b'. Although the first wire WL1' and first connecting wire CL1' have been described as a reference, the same description applies to the second wire WL2', the second connecting wire CL2', the third wire WL3', and the third connecting wire CL3'.

Because the first to third connecting wires CL1', CL2', and CL3' are arranged on a different layer from those of the first to third wires WL1', WL2', and WL3', the first to third wires WL1', WL2', and WL3' are not connected to each other. Therefore, different signals may be applied to the first to third wires WL1', WL2', and WL3'.

In addition, as described above with reference to FIG. 14, because the first wire WL1' includes the first-1 wire WL1a' and the first-2 wire WL1b' that are spaced apart from each other by the transmission area TA, there is no need for the first wire WL1' to bypass along the edge of the transmission area TA. For example, the first non-display area NDA1 surrounding the transmission area TA may be reduced.

Figure 17:
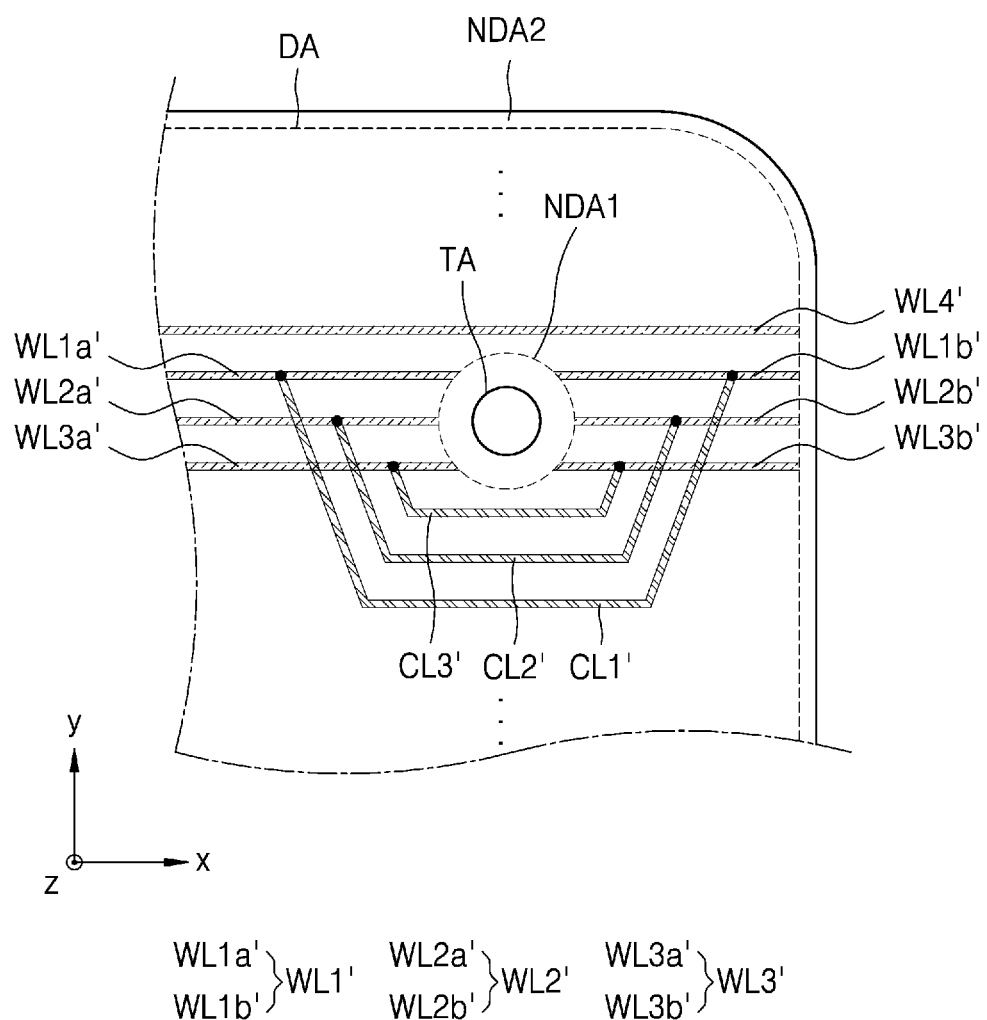
FIG. 17 is a plan view of a portion of a display apparatus according to an embodiment of the present invention.
Figure 18:
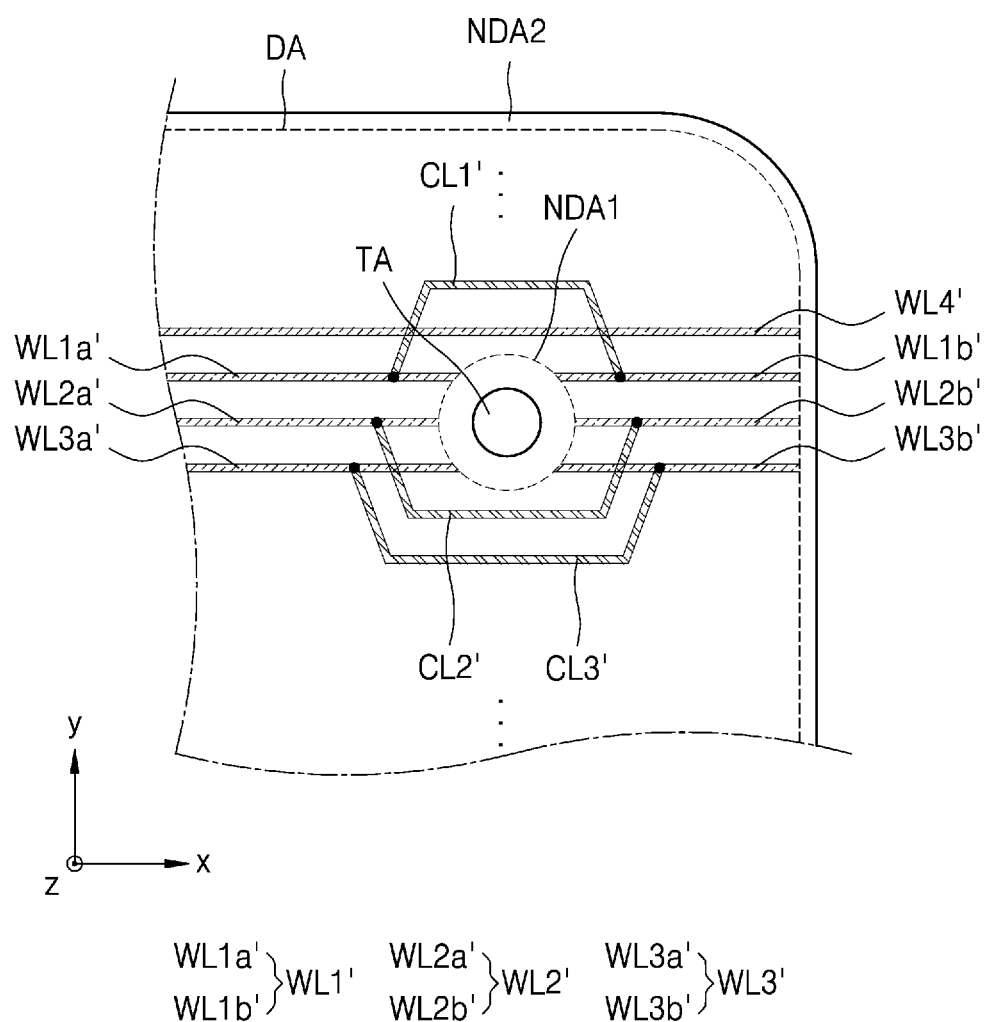
FIG. 18 is a plan view of a portion of a display apparatus according to an embodiment of the present invention.

FIGS. 17 and 18 are plan views of a portion of a display apparatus according to an embodiment of the present invention.

Referring to FIG. 17, the distance from the transmission area TA to the second connecting wire CL2' may be shorter than the distance between the first connecting wire CL1' and the transmission area TA. Further, the distance between the third connecting wire CL3' and the transmission area TA may be shorter than the distance between the second connecting wire CL2' and the transmission area TA. For example, the first connecting wire CL1' may be arranged farthest from the transmission area TA, and the third connecting wire CL3' may be arranged closest to the transmission area TA. The second connecting wire CL2' may be arranged between the first connecting wire CL1' and the third connecting wire CL3'.

Referring to FIG. 18, the first to third connecting wires CL1', CL2', and CL3' may be arranged in different directions based on the transmission area TA. The first connecting wire CL1' may be arranged above the transmission area TA, and the second connecting wire CL2' and the third connecting wire CL3' may be respectively arranged below the transmission area TA. As another example, the first connecting wire CL1' and the third connecting wire CL3' are respectively arranged above the transmission area TA, and the second connecting wire CL2' may be arranged below the transmission area TA. In addition, the first to third connecting wires CL1', CL2', and CL3' may be freely arranged above or below the transmission area TA.

In an embodiment of the present invention, data lines (see DL in FIG. 4) shown in FIG. 6 and scan lines (see SL in FIG. 4) shown in FIG. 14 may be arranged together in the display apparatus. For example, the data line DL extends in a first direction (e.g., a y direction) and may include a first data line and a second data line that are spaced apart from each other by the transmission area TA, and the first data line and the second data line may be connected to each other by a first connecting wire. In addition, the scan line SL extends in a second direction (e.g., an x direction) crossing the first direction and may include a first scan line and a second scan line that are spaced apart from each other by the transmission area TA, and the first scan line and the second scan line may be connected to each other by a second connecting wire.

In this case, both the data line DL and the scan line SL need not bypass along the edge of the transmission area TA. Accordingly, the data line DL and the scan line SL may be arranged adjacent to the transmission area TA, and the first non-display area NDA1 surrounding the transmission area TA may be reduced.

Although only a display apparatus has been described so far, the disclosure is not limited thereto. For example, a method of manufacturing the display apparatus is also within the spirit and scope of the present disclosure.

According to an embodiment of the present invention as described above, a display apparatus in which a non-display area is reduced and high-speed driving is possible may be implemented. However, the scope of the present invention is not limited thereto.

While the present invention has been described with reference to embodiments thereof, it will be understood by those of ordinary skill in the art that various changes in form and details may be made thereto without departing from the spirit and scope of the present invention.

What is claimed is:

1. A display apparatus comprising:
   a substrate having a transmission area, a display area, and a non-display area, wherein the display area surrounds the transmission area, and the non-display area is between the transmission area and the display area;
   a first wire arranged on the substrate and comprising a first-1 wire and a first-2 wire extending in a first direction and being spaced apart from each other by the transmission area;
   a first connecting wire arranged on a same layer as that of the first wire and connecting the first-1 wire to the first-2 wire; and
   a second wire extending in the first direction and comprising a second-1 portion and a second-2 portion, wherein the second-1 portion at least partially overlaps the first connecting wire and is arranged on a different layer from that of the first wire, and the second-2 portion is arranged on the same layer as that of the first wire.

2. The display apparatus of claim 1, further comprising:
an insulating layer between the substrate and the first wire and having a contact hole at least partially exposing the second-1 portion of the second wire, and
the second-2 portion of the second wire is connected to the second-1 portion through the contact hole.

3. The display apparatus of claim 1, wherein the first connecting wire comprises a first-1 connecting wire extending in the first direction, a first-2 connecting wire connected to one end of the first-1 connecting wire and extending in a second direction crossing the first direction, and a first-3 connecting wire connected to the other end of the first-1 connecting wire and extending in a third direction crossing the first direction.

4. The display apparatus of claim 3, wherein the first-2 connecting wire contacts the first-1 wire, and the first-3 connecting wire contacts the first-2 wire.

5. The display apparatus of claim 1, wherein different signals are applied to the first wire and the second wire.

6. The display apparatus of claim 1, wherein the first connecting wire comprises a first node and a second node, wherein the first node contacts the first-1 wire, and the second node contacts the first-2 wire, and wherein a same signal is applied to the first-1 wire and the first-2 wire through the first node and the second node.

7. The display apparatus of claim 1, wherein the first wire and the second wire include data lines.

8. The display apparatus of claim 1, further comprising:
a third wire arranged on the same layer as that of the first wire and comprising a third-1 wire and a third-2 wire extending in the first direction and being spaced apart from each other by the transmission area; and
a second connecting wire arranged on the same layer as that of the third wire and connecting the third-1 wire to the third-2 wire.

9. The display apparatus of claim 8, wherein the first connecting wire is arranged closer to the transmission area than the second connecting wire.

10. The display apparatus of claim 8, wherein the first connecting wire and the second connecting wire are arranged on one side and another side, respectively, of the transmission area.

11. The display apparatus of claim 8, wherein the transmission area comprises a first transmission area and a second transmission area that are spaced apart from each other, wherein the first-1 wire and the first-2 wire are spaced apart from each other by the first transmission area, and the third-1 wire and the third-2 wire are spaced apart from each other by the second transmission area, and
the first connecting wire is spaced apart from the second transmission area, and the second connecting wire is spaced apart from the first transmission area.

12. The display apparatus of claim 1, wherein the first wire and the first connecting wire are a single body.

13. A display apparatus comprising:
a substrate having a transmission area, a display area, and a non-display area, wherein the display area surrounds the transmission area, and the non-display area is between the transmission area and the display area;
a first wire arranged on the substrate and comprising a first-1 wire and a first-2 wire extending in a first direction and being spaced apart from each other by the transmission area;
an insulating layer arranged on the first wire and comprising a first contact hole and a second contact hole, wherein the first contact hole at least partially exposes the first-1 wire, and the second contact hole at least partially exposes the first-2 wire; and
a first connecting wire arranged on the insulating layer and bypassing the transmission area, wherein the first connecting wire connects the first-1 wire to the first-2 wire through the first contact hole and the second contact hole.

14. The display apparatus of claim 13, wherein the first connecting wire comprises a first-1 connecting wire extending in the first direction, a first-2 connecting wire connected to one end of the first-1 connecting wire and extending in a second direction crossing the first direction, and a first-3 connecting wire connected to the other end of the first-1 connecting wire and extending in a third direction crossing the first direction.

15. The display apparatus of claim 14, wherein a portion of the first-2 connecting wire is disposed in the first contact hole to contact the first-1 wire, wherein a portion of the first-3 connecting wire is disposed in the second contact hole to contact the first-2 wire, and a same signal is applied to the first-1 wire and the first-2 wire through the first contact hole and the second contact hole.

16. The display apparatus of claim 13, further comprising a second wire arranged on a same layer as that of the first wire and at least partially overlapping the first connecting wire,
wherein different signals are applied to the first wire and the second wire.

17. The display apparatus of claim 16, wherein the first wire and the second wire include scan lines.

18. The display apparatus of claim 13, further comprising:
a second wire arranged on a same layer as that of the first wire and comprising a second-1 wire and a second-2 wire extending in the first direction and being spaced apart from each other by the transmission area; and
a second connecting wire arranged on the insulating layer corresponding to the display area and connecting the second-1 wire to the second-2 wire,
wherein the first connecting wire is arranged closer to the transmission area than the second connecting wire.

19. The display apparatus of claim 13, further comprising:
a second wire arranged on a same layer as that of the first wire and comprising a second-1 wire and a second-2 wire extending in the first direction and being spaced apart from each other by the transmission area; and
a second connecting wire arranged on the insulating layer corresponding to the display area and connecting the second-1 wire to the second-2 wire,
wherein the first connecting wire and the second connecting wire are arranged on one side and another side, respectively, of the transmission area.

20. The display apparatus of claim 13, further comprising:
a first data line arranged on the substrate and comprising a first-1 data line and a first-2 data line extending in a second direction crossing the first direction and being spaced apart from each other by the transmission area;
a second connecting wire arranged on a same layer as that of the first data line corresponding to the display area, and connecting the first-1 data line to the first-2 data line; and
a second data line extending in the second direction and comprising a second-1 portion and a second-2 portion, wherein the second-1 portion at least partially overlaps the second connecting wire and is arranged on a different layer from that of the first data line, and the second-2 portion is arranged on the same layer as that of the first data line.

* * * * *